United States Patent
Bridgelall et al.

(10) Patent No.: US 6,330,973 B1
(45) Date of Patent: Dec. 18, 2001

(54) INTEGRATED CODE READING SYSTEMS INCLUDING TUNNEL SCANNERS

(75) Inventors: Raj Bridgelall, Ronkonkoma; Howard Shepard, Great River; Edward Barkan, Miller Place; Robert Sanders, St. James; Mitch Maiman, Holbrook; Paul Dvorkis, E. Setauket; Joseph Boriotti, East Northport; Mark Krichever, Hauppague; Vladimir Gurevich, Ronkonkoma; Alexander Breytman, Bellmore, all of NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/305,463

(22) Filed: May 6, 1999

Related U.S. Application Data

(63) Continuation-in-part of application No. 09/182,205, filed on Oct. 30, 1998, and a continuation-in-part of application No. 08/877,652, filed on Jun. 17, 1997, and a continuation-in-part of application No. 08/652,830, filed on May 23, 1996, now abandoned, which is a division of application No. 08/377,732, filed on Jan. 25, 1995, now Pat. No. 5,691,528, and a continuation-in-part of application No. 08/153,053, filed on Nov. 17, 1993, now Pat. No. 5,504,316, which is a division of application No. 08/127,898, filed on Sep. 14, 1993, now Pat. No. 5,495,097, and a continuation-in-part of application No. 08/108,521, filed on Jul. 19, 1993, now abandoned, and a continuation-in-part of application No. 08/037,143, filed on Mar. 25, 1993, now abandoned, and a continuation-in-part of application No. 08/028,107, filed on Mar. 8, 1993, now Pat. No. 5,408,081, and a continuation-in-part of application No. 07/981,448, filed on Nov. 25, 1992, now Pat. No. 5,478,997, which is a division of application No. 07/868,401, filed on Apr. 14, 1992, now Pat. No. 5,280,165, which is a division of application No. 07/715,267, filed on Jun. 14, 1991, now Pat. No. 5,235,167, which is a division of application No. 07/520,464, filed on May 8, 1990, now Pat. No. 5,168,149, which is a continuation-in-part of application No. 07/428,770, filed on Oct. 30, 1989, now Pat. No. 5,099,110.

(51) Int. Cl.$^7$ ................................ G06K 7/10; G06K 9/22
(52) U.S. Cl. ................................ 235/462.45; 235/462.01; 235/462.43
(58) Field of Search ................................ 235/383, 385, 235/472.01, 462.01, 375, 470, 462.45, 462.43

(56) References Cited

U.S. PATENT DOCUMENTS

| 4,369,361 | 1/1983 | Swartz et al. | 235/470 |
| 4,652,732 | 3/1987 | Nickl | 235/462.01 |

(List continued on next page.)

FOREIGN PATENT DOCUMENTS

| 0551 108 A | * | 1/1993 | (EP) . |
| 533 365 A2 | | 3/1993 | (EP) . |

(List continued on next page.)

OTHER PUBLICATIONS

Tunnel Scanning—An Emerging Market To Watch, SCAN: The Data Capture Report, Apr. 10, 1998.

*Primary Examiner*—Karl D. Frech
(74) *Attorney, Agent, or Firm*—Burns, Doane, Swecker & Mathis, L.L.P.

(57) ABSTRACT

The invention relates to systems and techniques for reading optical codes, and more particularly to code reading systems with plural imaging or scanning modules pointed in various directions toward a target volume, which increase the likelihood that a code symbol on an arbitrarily oriented object in the target volume will be read. Other aspects of the invention relate to use and configuration of hand held readers, docking devices, operator side rails, arched tunnels and mirrors for increasing the coverage of the system, Additional aspects of the invention relate to components associated with point of sale installations or code reading terminals including integrated scales, input pads, system controls and displays.

5 Claims, 17 Drawing Sheets

U.S. PATENT DOCUMENTS

| | | | |
|---|---|---|---|
| 4,676,343 | * 6/1987 | Humble et al. | 186/61 |
| 4,760,248 | 7/1988 | Swartz et al. | 235/472.01 |
| 4,879,650 | 11/1989 | Kurimoto et al. | 364/405 |
| 4,939,355 | * 7/1990 | Rando et al. | 255/467 |
| 4,971,177 | 11/1990 | Nojiri et al. | 186/61 |
| 5,008,518 | 4/1991 | Taussig et al. | 235/383 |
| 5,019,714 | 5/1991 | Knowles . | |
| 5,099,110 | 3/1992 | Shepard et al. | 235/472.01 |
| 5,214,270 | * 5/1993 | Rando | 235/472.01 |
| 5,229,588 | * 7/1993 | Detwiler et al. | 235/467 |
| 5,235,167 | 8/1993 | Dvorkis et al. | 235/462.01 |
| 5,252,814 | 10/1993 | Tooley . | |
| 5,280,165 | 1/1994 | Dvorkis et al. | 235/470.01 |
| 5,478,997 | 12/1995 | Bridgelall et al. | 235/462.01 |
| 5,494,136 | * 2/1996 | Humble | 186/61 |
| 5,495,097 | 2/1996 | Katz et al. | 235/462.01 |
| 5,497,314 | * 3/1996 | Novak | 364/403 |
| 5,679,941 | * 10/1997 | Iizaka | 235/383 |
| 5,691,528 | 11/1997 | Wyatt et al. | 235/462.01 |
| 5,705,802 | * 1/1998 | Bobba et al. | 235/467 |
| 5,767,501 | * 6/1998 | Schmidt et al. | 235/472.01 |
| 5,770,848 | * 6/1998 | Oizumi et al. | 235/462.01 |
| 5,872,354 | 2/1999 | Hanson | 235/462.01 |
| 5,900,610 | * 5/1999 | Kelly, Jr. | 235/385 |
| 5,978,772 | * 11/1999 | Mold | 705/16 |
| 6,061,645 | * 5/2000 | Bengala | 702/156 |

FOREIGN PATENT DOCUMENTS

| | | |
|---|---|---|
| 595 371 A2 | 5/1994 | (EP) . |
| 764 417 A1 | 3/1997 | (EP) . |
| 403130896 | * 1/1993 | (JP) . |

* cited by examiner

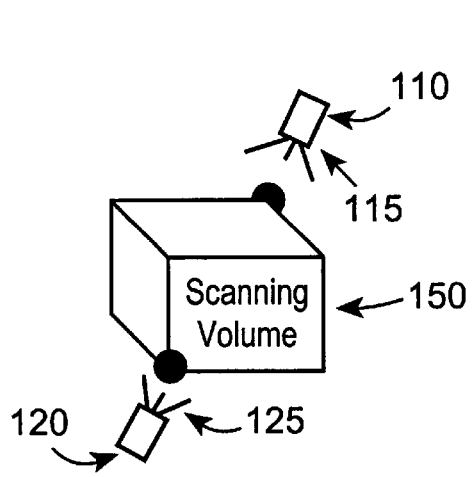
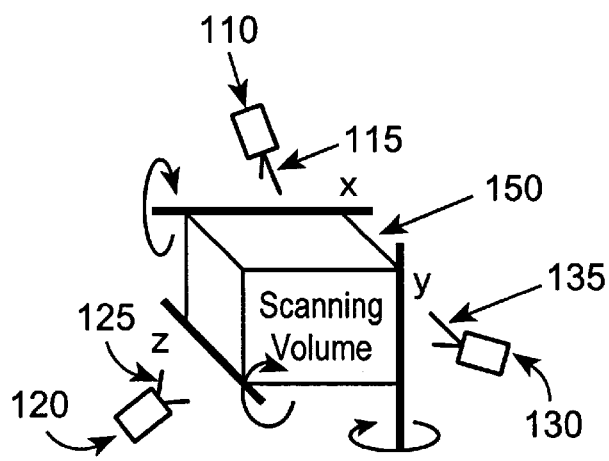
FIG. 3(a)          FIG. 3(b)
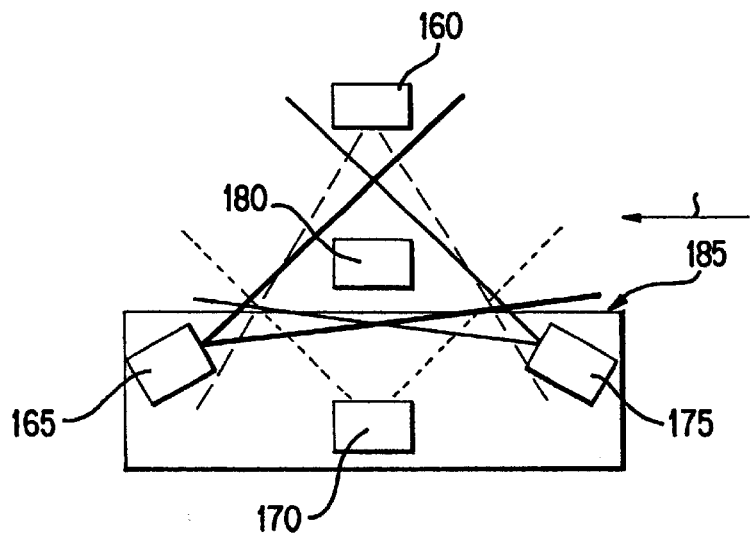
FIG. 4

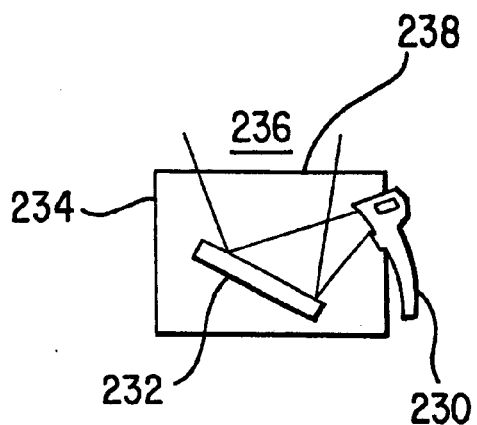 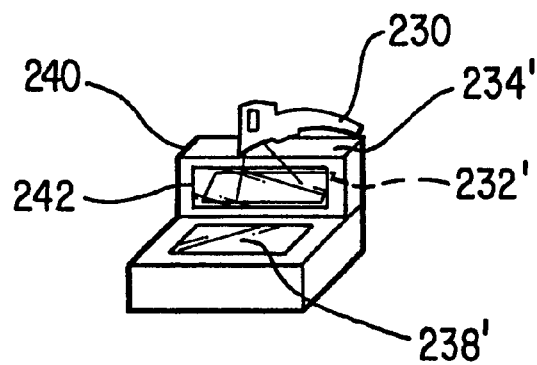
FIG. 7(a)    FIG. 7(b)
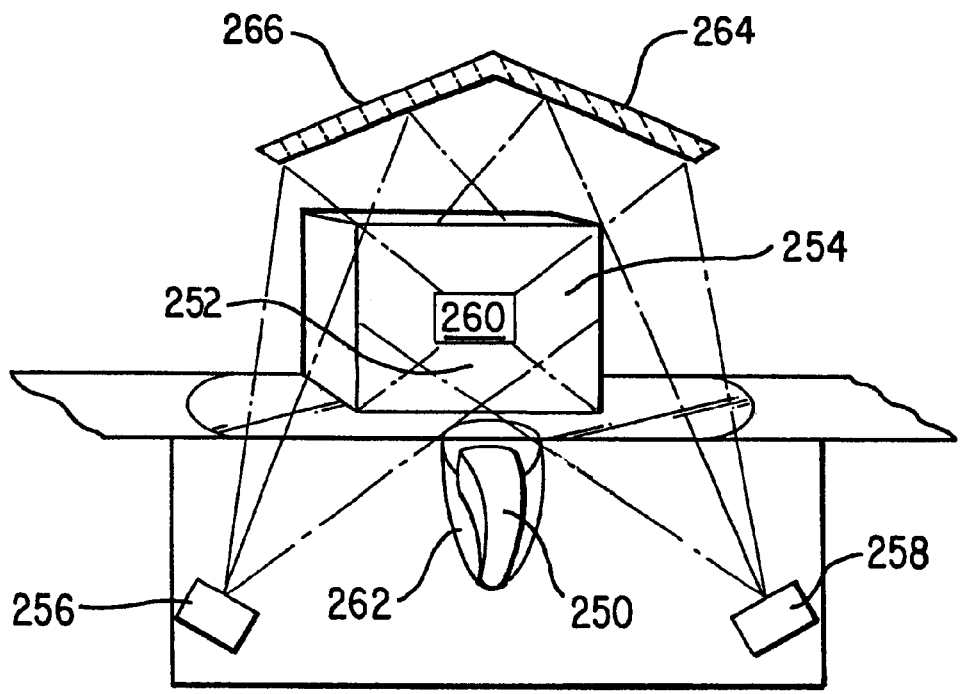
FIG. 8

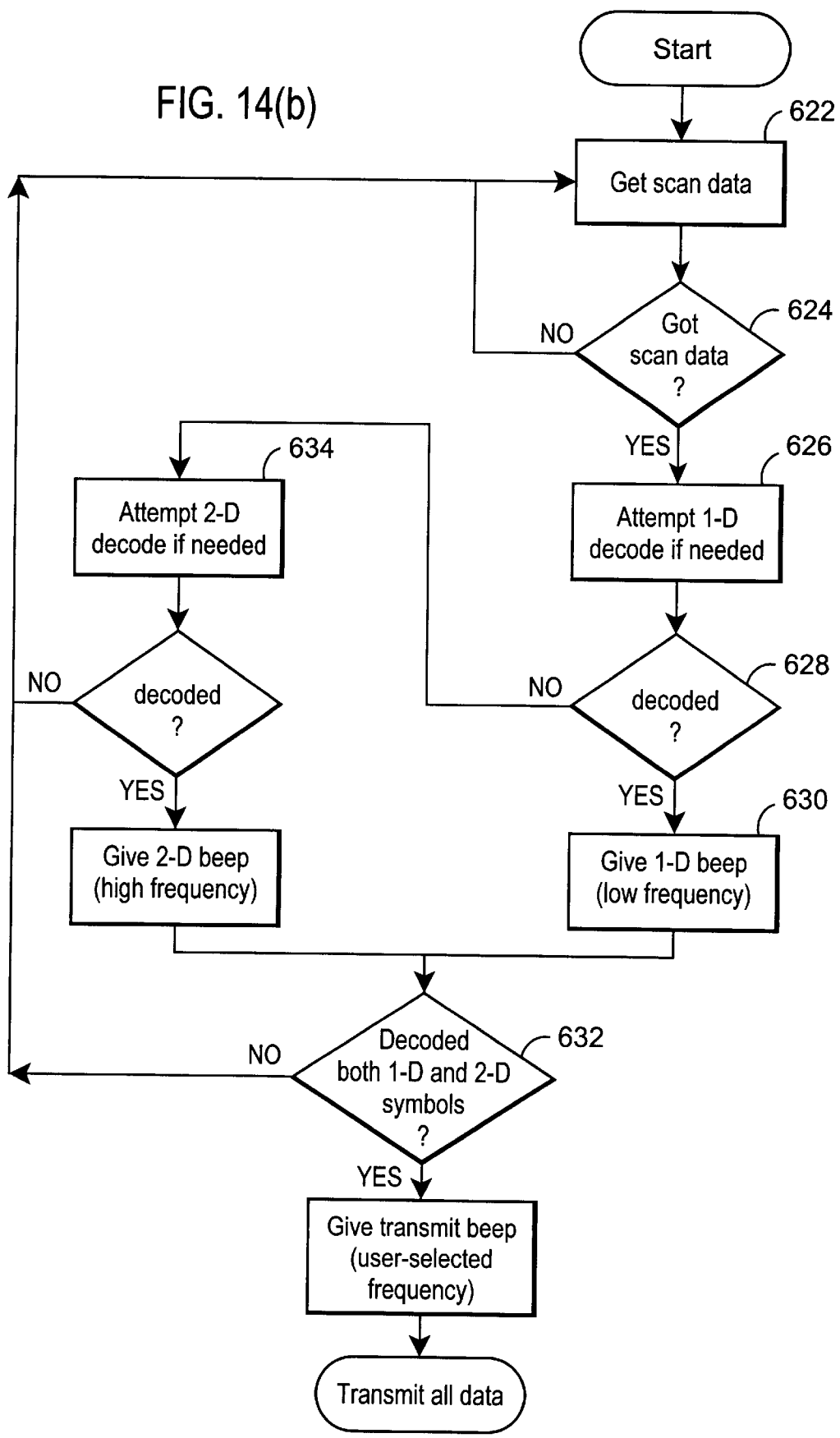

INTEGRATED CODE READING SYSTEMS INCLUDING TUNNEL SCANNERS

RELATED APPLICATIONS

This application is a Continuation-in-part of U.S. patent application Ser. No. 09/182,205, filed Oct. 30, 1998, which is hereby incorporated by reference.

This application is also a Continuation-in-Part of U.S. patent application Ser. No. 08/652,830, filed May 23, 1996 now abandoned, which is a Divisional of U.S. patent application Ser. No. 08/127,898, filed Sep. 14, 1993, now U.S. Pat. No. 5,495,097, which is hereby incorporated by reference.

This application is also a Continuation-in-Part of U.S. patent application Ser. No. 08/877,652, filed Jun. 17, 1997, which is a Divisional of U.S. patent application Ser. No. 08/377,732, filed Jan. 25, 1995, now U.S. Pat. No. 5,691,528, which is hereby incorporated by reference. The 08/337,732 application is a Continuation-in-Part of U.S. patent application Ser. No. 08/153,053, filed Nov. 17, 1993, now U.S. Pat. No. 5,504,316. The 08/337,732 application is also a Continuation-in-Part of U.S. patent application Ser. No. 08/108,521, filed Jul. 19, 1993 now abandoned, which is a Divisional of U.S. application Ser. No. 07/868,401, filed Apr. 14, 1992, now U.S. Pat. No. 5,280,165, which in turn is a Divisional of U.S. application Ser. No. 07/520,464, filed May 8, 1990, now U.S. Pat. No. 5,168,149, which is a Continuation-in-Part of U.S. application Ser. No. 07/428,770, filed Oct. 30, 1989, now U.S. Pat. No. 5,099,110. The 337,732 application is also a Continuation-in-Part of U.S. application Ser. No. 08/037,143, filed Mar. 25, 1993 now abandoned, which is a divisional of U.S. application Ser. No. 07/715,267, filed Jun. 14, 1991, now U.S. Pat. No. 5,235,167. The 08/037,732 application is also a Continuation-in-Part of Ser. No. 07/981,448 filed Nov. 25, 1992, now U.S. Pat. No. 5,478,997. The 0/337,732 application is also a Continuation-in-Part of Ser. No. 08/028,107 filed Mar. 8, 1993, now U.S. Pat. No. 5,408,081.

FIELD OF THE INVENTION

The present invention relates to systems used in reading optical code symbols, and more particularly to optical code reading systems having multiple aiming axes or fields of view, which minimize the amount of manipulation an operator of these systems has to perform to locate the optical code symbol in a reading path of the system. Other aspects of the invention relate to the arrangement of code reading modules and other components such as arched tunnels, hand held readers and docking stations therefore, scanning side rails, integrated weighing platforms, input pads, displays and audible indicators associated with a point of sale installation or code reading terminal.

BACKGROUND AND OBJECTS

Optical systems for reading optical code symbols such as bar code, matrix code and two-dimensional symbologies are well known. Some known imaging optical code reading systems are capable of reading a variety of different codes from various angles and distances. Generally, imagers and laser beam scanning systems electro-optically transform optical code into electrical signals which are decoded into alpha-numerical characters or other data. These data are in digital form and are used as input to a data processing system in, for example, a point of sale (POS) environment for looking up a price for the article.

Laser scanner modules and imaging optical code reading modules typically have a field of view centered about an optical axis or line of sight. Ideally the scanner module or imager module reads a bar code in the working range located on an optical plane substantially perpendicular to the line of sight. However, most scanner modules and imager modules can effectively read codes on many other planes and surfaces at a variety of different angles and orientations within the field of view.

Early scanning systems were constructed with single aiming axes or fields of view, and required precise positioning of the code symbol with respect to the scanning head.

Scanners with two planar scanning windows oriented at an angle to one another have become popular for both supermarkets and mass merchandisers. Such scanners increase the checkout throughput, which is important in environments where large numbers of articles products are scanned. With one planar scan module, an operator has to ensure that the bar code symbol is oriented in the single field of view and at a working distance that enables a beam to read the symbol. Systems with two window scanners reduce the amount of manipulation that the operator has to perform in properly positioning the article for scanning. In a two window scanner system, the operator only has to ensure that the bar code symbol is read throughout at least one of the scan windows. Such systems may include a horizontal scanning window and a generally vertical scanning window from which laser lines for scanning bar code symbols originate. Typically, an operator is situated on the side of the scanner that is opposite the vertical scanning window.

Some such scanners can perform adequately in reading bar code symbols on any of four sides of an article positioned in the system. These sides are, from an operator's point of view, the side of the article facing down, the side of the article positioned away from the operator (facing the vertical window), the leading side of the article (the side pointing in the article's direction of travel) and the trailing side of the article. One known scanner, the Spectra Physics Magellan Scanner, also attempts to read symbols positioned on the side opposite to a vertical window (i.e., the side of the article facing the operator), but it is only successful when the article is positioned at least a predetermined distance from the operator or if the symbol is very close to the bottom of the article. The laser lines that read symbols on this side of the scanner are emitted though the horizontal scanning window on which the article is located. These lines project upwards and away from the operator at about 45 degrees and require a distance of travel before they can reach a certain height on the side of the article. An NCR scanner is also capable of reading symbols on the top of the scanned article.

In conventional systems, an operator visually locates the symbol as he or she moves the article towards the scanner. The system can read the code only if it is located in such a position so that it passes through the field of view of one of the scan heads in one of the windows. If the symbol is not located in such a position, the operator must re-orient the product and pass it over the scanner. In practice, if the operator cannot visually locate the symbol, he assumes that it may be on the side of the article that is facing downward or on the side of the article facing the vertical scanning window. The operator has to decide if he wants to risk moving it through the scanning system without locating the symbol, hoping that the system will find the symbol. The operator will not be certain that his hand is not covering the symbol. If the operator decides to make an attempt at scanning without locating the symbol and the scan attempt fails to locate or read a symbol, the operator will have to move the article back and try again, this time locating the symbol visually to assure success. This is time consuming, and therefore, is an inefficient process. Many operators will avoid such a scenario by visually locating the symbol and repositioning the article, if necessary, before moving the article through the scanning system. This usually assures a reading on the first attempt but the process requires a certain amount of time which reduces the efficiency of the scanning operation. Moreover, in order to visually locate the symbol, the article must be turned so the symbol is pointed towards the operator. The vertical window of conventional two window scanners, however, is positioned to read symbols on the side of the article facing away from an operator. Thus, operators must rotate the product towards themselves to locate the symbol, and then re-orient the package towards either the horizontal or vertical window.

It has been proposed to configure optical code reading systems with more than two aiming axes or fields of view in order to achieve more reliable or complete scanning. Examples of systems utilizing a plurality of scan modules oriented with their respective lines of sight aiming in different directions, so as to nominally scan two or more optimal planes within a scanning volume are illustrated in U.S. Pat. No. 5,495,097, assigned to Symbol Technologies, Inc. Two systems disclosed in the aforementioned patent are illustrated in FIGS. 1 and 2. Elements 10 in the Figures are scan modules or heads. The system of FIG. 1 includes a conveyor 12 which moves code bearing articles past the scanning heads. The system is an example of what is generally referred to as a "tunnel scanner". The system of FIG. 2 employs a counter 14 on which code bearing objects are supported or moved. This system is referred to as an "inverted tunnel scanner".

While such systems theoretically provide improved optical code reading capabilities over conventional systems, there is a need to develop code reading systems with multiple fields of view which can more accurately, reliably and inexpensively read optical codes which are essentially randomly oriented with respect to the system and the operator.

Accordingly, it is an object of the present invention to provide code reading systems which are ergometrically acceptable and capable of reading codes from multiple fields of view intersecting a position or path of the coded article. This would eliminate the time consuming and repetitive motion of re-orienting the article towards one of the scan heads or imagers provided by today's systems.

It is another object of the present invention to provide such a system which is simply and inexpensively fabricated.

It is another object of the present invention to provide a code reading system which minimizes or reduces obstructions to the views and movements of the operator.

It is another object of the present invention to provide a code reading system which incorporates hand held readers, information displays and data inputs for operator and customer, while minimizing obstructions to their views.

It is another object of the present invention to provide tunnel and inverted tunnel scanner which requires a minimum amount of hardware and provides high performance from a small number of scan modules and/or imager modules.

Many conventional scanning systems are used in conjunction with a point of sale installation or check out counter. In many cases a single or double window slot scanner or a single hand held scanner or imager module is used in the code reading process. Some audible and visual indicators are provided at the installation such as the familiar beep and price displays. Weighing stations are sometimes also provided. In general, these code reading systems are often add-on items and not well integrated with other structures and functions at the installation.

It is a further object of the present invention to provide integrated weighing systems for use with optical code readers.

It is another object of the present invention to provide more accessible and useful visible and audible information concerning the code reading process to the operator and/or customer.

It is yet another object to integrate code reading devices with multiple fields of view into a point of sale system having greater capabilities for data acquisition and data display.

These and other objects and features will be apparent from this written disclosure and accompanying drawings.

SUMMARY

The present invention relates to an apparatus useful in reading optical code symbols. Various embodiments of a scanning system use a plurality of scan modules or imager modules located at various positions with respect to a symbol-bearing article's location or path.

In an exemplary embodiment, an optical code reading system may comprise at least one optical scanning module located in a fixed position with respect to a scanning volume of the system and a movable optical scanning module capable of hand held operation and aiming. The movable module is selectively held by a holding member in a position which enables the module to read optical codes in the scanning volume which cannot be read by the fixed position optical scanning module.

In another preferred embodiment, the holding member includes at least one mirror in the system housing for aiming a field of view of the movable optical code reading module toward the target volume of the system. Another embodiment includes at least one mirror located over the target volume for redirecting at least a portion of the field of view of at least one of the code reading modules toward the top of the target volume.

Other embodiments of the present invention employ a scanner located in whole or in part in a raised side rail of the scanning station. The station may include a horizontal surface for supporting target objects, and a housing including a portion on a side of the horizontal surface nearest to the operator and extending above the plane of the horizontal surface. The raised portion of the housing contains at least a first optical code reading module for reading optical codes on sides of the target objects including a side generally facing the operator, the first module having a field of view which is higher than the housing at a location directly above an edge of the horizontal surface located nearest to the operator. Such a system may also include a horizontal window in said horizontal surface and at least a second optical code reading module located underneath the horizontal window for reading optical code on at least the underside of target objects located on the horizontal window. Advantageously the raised portion of the housing is a side rail which rises no more than about two inches above the plane of the horizontal surface. The first optical code reading module is positioned a distance away from the edge of the horizontal window nearest the side rail, the distance being selected to permit the field of view of the first module to project upwardly to a sufficient degree to include symbols on the sides of target objects facing the operator and located above the edge of the horizontal window nearest the operator. Such an optical scanning station may also include a third optical code reading module located in said housing portion, which third module together with the first module have fields of view which include, respectively, upper and lower areas on the sides of target objects facing the operator and located above the edge of the horizontal window nearest the operator. Fourth and fifth code reading modules may be provided with fields of view angled in directions toward the leading and trailing edges of the target object.

Other embodiments of the present invention are integrated point of sale or a checkout systems. The system may comprise a conveyor at a predetermined height for horizontally transporting a plurality of objects. At least some of these objects may bear an optical code symbol. Code reading modules may be located downstream of said conveyor. The code reading system may comprise a scanning module located under a window in the horizontal surface. This surface may be at the same height as the conveyor. A hood or arched portion of the system housing may form a tunnel over the horizontal surface on which code bearing objects pass. The hood portion may include at least one optical scanning module for reading the symbols which cannot be read by other system modules. An operator display terminal is attached to the hood to enable an operator of the system to read information derived from the symbols after they have been decoded. A customer display is also attached to the hood opposite the operator and closer to the customer for displaying the same information that is being displayed to the operator. A cash drawer may be located underneath the horizontal scanning window on the operator side to process the transaction. A support surface projecting outward from the hood towards the customer may also be included on which the customer can place small articles such as, for example, a checkbook, a pen or keys. A movable optical scanning module capable of hand held operation and aiming may also be included. This module is selectively held by a holding member. This module is held in a position whereby the movable module may read optical codes in the scanning volume which cannot be read by the fixed position optical scanning modules.

Audio signal systems for use in conjunction with a checkout systems are also disclosed.

The present invention also includes techniques and apparatus for providing a code reading system with a selectable number of code reading modules and fields of view. In accordance therewith a code reading terminal is provided with a motor control system for controlling the motion of moving optical elements of plural laser scan modules. Decoder circuitry is provided for receiving information from plural code reading modules and for decoding said information. Plural module stations located in various places in the terminal, each contain electrical couplings for connecting a laser scan module to the motor control system and decoder circuitry, and mounting members for aiming the module at a target volume of the system. Optionally a docking station may be provided for holding a hand held code reading module in a position so that it is fixedly aimed at the target volume of the system. The module station and docking station are arranged around the target volume. Modules are obtained and attached to the code reading terminal to provide selected fields of view of the target volume, appropriate for the scanning jobs done at the terminal. At a later time the terminal can be upgraded by adding additional laser scan modules at unused module stations.

The present invention also includes techniques for integrating a scale into a checkout or point of sale scanning terminal. Such systems include a supporting base and a weighing platform movably supported on the supporting base, the platform having a horizontal surface for receiving the target object. The horizontal surface may include a horizontal window through which at least one optical code reading module is directed. A raised side rail on a side of the horizontal surface nearest the operator may contain a second optical code module with a field of view directed over the horizontal surface. Vertical movement of the weighing platform in response to the weight of the target object is detected to produce a signal related in value to the weight of the target object. In order to inhibit or prevent the target object from interfering with the weighing process by exerting force on portions of the system other than the platform, in one embodiment the side rail is angled over the horizontal surface. In an alternate embodiment, the raised side rail and the weighing platform are movably supported on the supporting base, so that both move vertically in unison in response to the weight of the target object. The system may further comprise a "light rail" subsystem for detecting when a target object overhangs the weighing platform. Such a subsystem includes at least one source of a light beam; and at least one detector for said light beam, the light beam being located near an edge of said weighing platform. The system produces a signal indicating a possible error in the weighing operation when an object is detected overhanging the weighing platform.

The present invention also includes certain optical techniques for improving the construction, performance and size of laser beam scanning modules used in the foregoing systems. One such technique is a two component focusing system. The system includes a laser for producing a laser beam, a first optical element in an optical path of the laser beam for prefocusing the laser beam, and a second optical element in the optical path of the laser beam for receiving the beam from the first optical element. The second optical element may be moved in a direction to cause the laser beam to scan across a bar code. The second optical element is curved about an axis perpendicular to the direction of movement and provides a non-zero optical power.

In one embodiment, the second optical element is a concave cylindrical mirror which increases laser beam power throughput. In another embodiment, the second optical element is a convex cylindrical mirror which increases the effective internal optical path of the system, thereby decreasing the physical size of the optical system.

The foregoing is a general summary of aspects of the present invention, it being understood that the invention to be protected is defined by the claims and all equivalents recognized by law.

BRIEF DESCRIPTION OF THE DRAWINGS

FIGS. 3 (a) and (b) illustrate general concepts involving the use of plural scanner heads to provide multiple fields of view in relation to a scanning volume;

FIG. 4 illustrates an arrangement of scan heads or imaging engines in accordance with a preferred embodiment of the present invention;

FIGS. 7(a), 7(b) and 8 illustrate the use of mirrors in preferred embodiments of the present invention;

FIGS. 14(a) and 14(b) are respectively a schematic block drawing and flow chart illustrating certain aspects of an audible indicator system of preferred embodiments of the present invention;

DETAILED DESCRIPTION

OUTLINE

Figure 1:
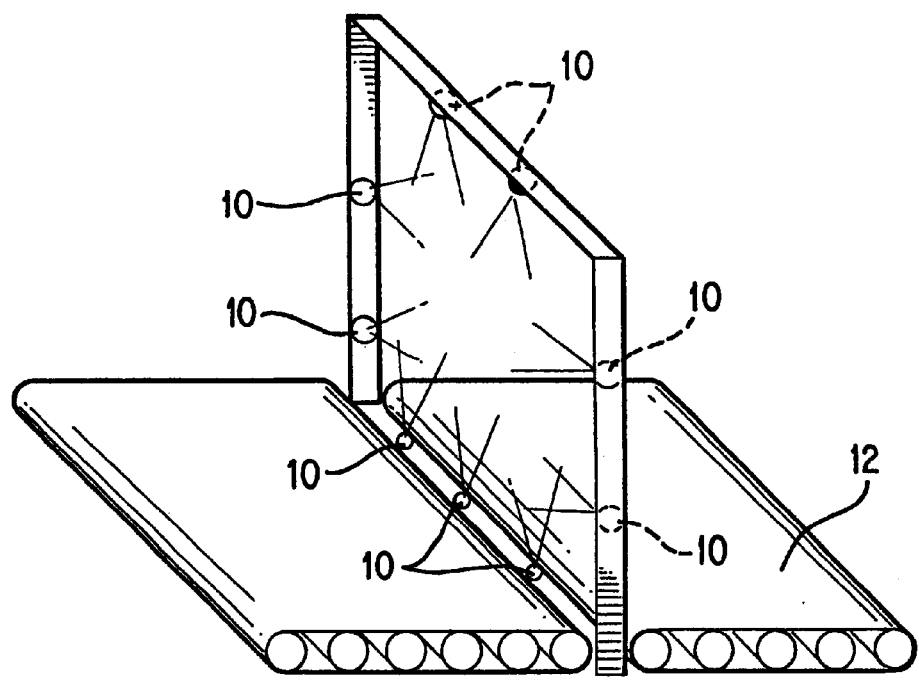
FIGS. 1 and 2 are examples of prior art tunnel and inverted tunnel scanners.
Figure 2:
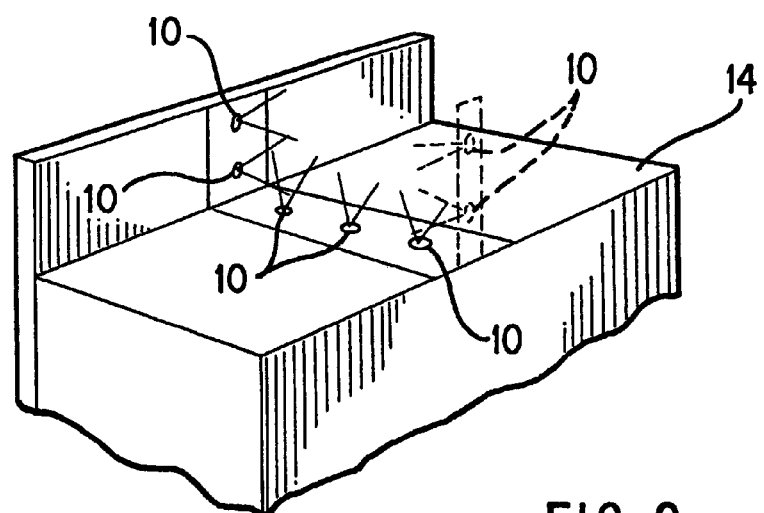

I. Code Readers With Multiple Fields of View.
II. Implementations Employing Multiple Laser Scanner Modules Or Imager Modules, Mirrors And Hand held Code Readers.
III. Modular Construction: Electronic Integration Of Multiple Scanner Modules Or Imager Modules.
IV. Ergometric Designs For Point Of Sale Code Reader Systems With Multiple Fields Of View.
V. Code Reader Systems Including Side Rail-Located Code Readers Or Windows.
VI. Two Component Focusing.
VII. Audible Signals For Code Readers.
VIII. Integrated Weighing Systems.

I. Code Readers with Multiple Fields of View

FIGS. 3(a) and 3(b) illsustrate the deployment of multiple scan modules or imager modules and corresponding scanning or imaging volumes.

Typically, omni-directional multi-planar scanning systems have restricted decode zones in a three dimensional field through which an optical code passes for decoding. An example of multi-planar scanning systems are illustrated in FIGS. 3(a) and 3(b). These scanning systems utilize a plurality on Omni-directional Scan Modules (OSMs), designated 110, 120, and 130. Scan lines, designated 115, 125, and 135, emanating from sources such as a spinning polygon, are directed toward a three demensional scanning volume where scanning is performed. However, in order to decode bar codes omni-directionally in the scanning space while maintaining the required scan line density per plane, a relatively large number of scan lines are needed. This can be achieved by increasing both the number of scan line generating facets of the polygon and the number of fixed position mirrors off which the scan lines are deflected. The systems will become substantially larger and more expensive if the signal quality is to be maintained.

One approach for minimizing the size and cost of a code reading system with fields of view and capability of reading codes on an arbitrarily oriented surface in the scanning volume is to minimize the number of OSMs. Returning to FIGS. 3(a) and 3(b), two possible minimal configurations that cover a decode sphere within the volume 150 are illustrated. However, the degree of coverage, or the size of this sphere will depend on the yaw, pitch, roll and range abilities of each OSM. Such a deployment may not be ergonomically feasible in, for example, the Point of Sale (POS) invironment. Therefore, these potentially minimum configurations are not practical for most situations.

What is needed, therefore, is a method for increasing the number of omni-directional scanning or imaging planes while maintaining or even increasing the scan line density per plane. From an economic point of view, it is desirable to achieve this without substantially increasing the size or cost of the system.

Preferred embodiments of the present invention permit a modularized deployment of scan modules or imager modules deployed within the ergonomic constraints of a POS installation. The result is an acceptable trade-off for cost and coverage. The manufacturer or customer can decide on the location and number of scan modules or imager modules of a system based on individual needs and criteria.

An advantageous arrangement provides a substantially complete three-dimensional spatial coverage. Each OSM may have a dense rotating Lissajous scanning pattern that provides a complete omni-directional coverage within the field that it is projected onto. The prescribed yaw and pitch performance of each system will affect the degree of coverage per OSM.

Figure 12A:
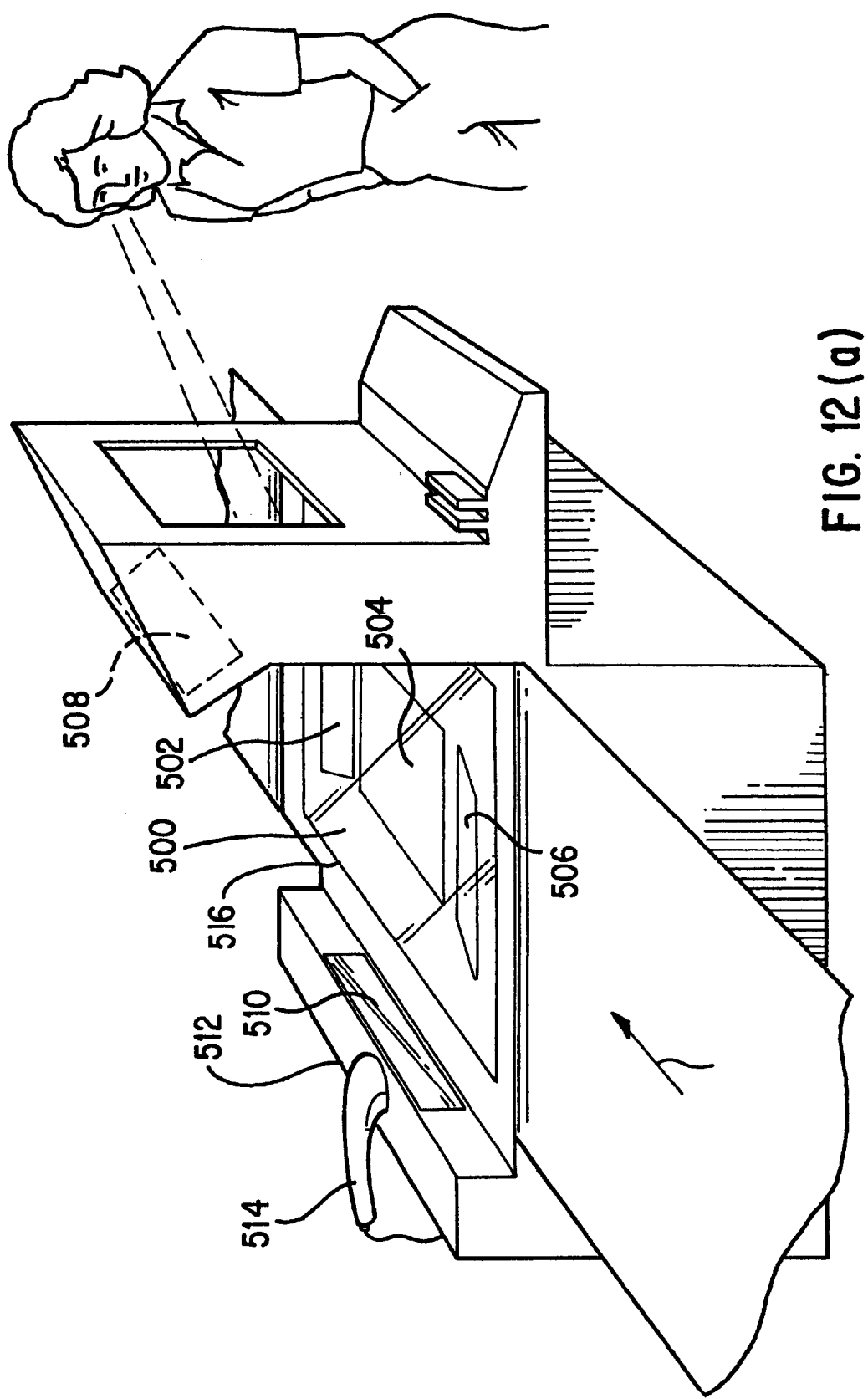
FIGS. 12(a) and (b) are pictorial views of an alternative embodiment of a point of sale installation in accordance with preferred embodiments of the present invention.

The coverage for each scan modules or imager module of FIG. 4 in a POS environment is given in Table 1 below. A POS system embodiment, showing the locations of the components is shown in FIG. 12(a).

| OSM | Optical Code Location Covered* | Location of OSM |
| --- | --- | --- |
| 160 | Top and partial back of article | Under arch |
| 165 | Leading side and partial downward facing side of article | Angled under the horizontal scanning window 185 |
| 170 | Downward facing side of article | Under the horizontal scanning window 185 |
| 175 | Trailing side and partial downward facing side of article | Angled under the horizontal scanning window 185 |
| 180 | Back of object (field of view directed out of the plane of Figure 4) | Angled under the horizontal scanning window 185 or inside upright support on customer side |

*Location in reference to an operator

OSMs 165 and 170 or OSMs 170 and 175 are arranged in a manner that may also use additional mirrors to project a pattern in much the same manner as conventional slot scanners.

The modular concept permits a tradeoff cost for performance or planar coverage. For example, in some use environments, two scan modules (a bi-planar implementation) with higher scan pattern density per plane will provide ample coverage. If more is required, the manufacturer will simply supply an additional scan modules or imager modules engines as discussed in section III below.

II. Implementations Employing Multiple Scan Modules or Imager Modules, Mirrors and Hand Held Code Readers In order to obtain the desired multiple fields of views and system flexibility while minimizing hardware costs, preferred embodiments of the present invention employ multiple function hand held code readers and/or mirrors. In one embodiment a hand held unit can be employed as a substitute for a fixed position OSM. In this case, the hand held unit may be a complete unit in the sense of containing its own decoding circuitry, or the unit may simply be a laser scan module or imager module, which provides a data stream to centralized processing circuitry.

Figure 5:
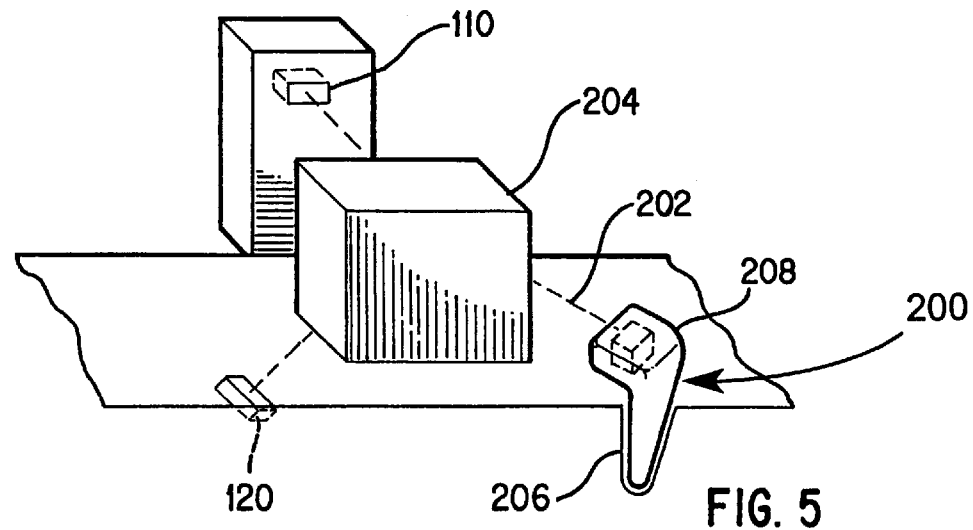
FIG. 5 is a pictorial schematic view of a code reading system with multiple fields of view using a docked, hand held code reader, in accordance with a preferred embodiment of the present invention.

A simplified example of such use of a hand held unit is shown in FIG. 5. The system coverage of the apparatus of FIG. 5 is similar to that of FIG. 3(b). However, one of the OSMs 130 of FIG. 3(b) is replaced by a hand held scanner 200, releasably held in a fixed position, with its optical axis 202 aimed toward the scanning volume or target object 204. As shown in FIG. 5, the means for holding the hand held scanner may be a docking cavity 206, adapted to receive the handle of the hand held code reader. This implementation enables the user to have access to a hand held, manually aimable hand held unit, which doubles as a fixed position code reader. The hand held unit 200 may contain a conventional laser scan module 208. Alternatively, in environments where image blur and aiming are not a problem, an imager module may be employed, particularly a sophisticated type capable of reading various types of one and two dimensional codes such as postal code, PDF417 code, MaxiCode, etc. Such a hand held unit may use the imaging engine described in U.S. patent application Ser. No. 09/096,578 entitled "Imaging Engine And Method For Code Readers", which is hereby incorporated by reference. In either embodiment, the hand held unit may contain its own decoding circuitry.

An additional benefit of the disclosed system is that each reading module can be optimally aimed and focused for the best performance in its designated working distance. Where a laser scan module is used, the scan pattern can also be optimized for best performance in its scanning plane. In the case of the hand held unit, a focus switching mechanism such as a movable lens or aperture, can be utilized to optimize the performance of the detachable unit for hand held use as well as the "docked" mode. A bizoom lens system for an imager module is disclosed in the above-referenced copending patent application.

In further exemplary embodiments, a portable, hand held computing device such as a PALM PILOT, equipped with an optical code reader may be used as the heart of a small stand-alone cash register for a small store or as one of a number of code readers connected to a host terminal and/or a central computer in a large store. The portable device may also be used as a hand held scanner whenever the item to be scanned cannot be placed in the path of the scan beams either due to the size or weight of the product. The portable device may also be used to check store inventory or scan newly received items at the receiving dock. Information pertaining to newly added items may be added to the price file by scanning the information or by entering it manually using the portable devices pen or touch pad input capability. Such a device may also be used, for example, as both a fixed mounted or hand held code reader for inventory-control or tracking such as in a factory, shipping facility, library or blood bank.

Figures 6A, 6B:
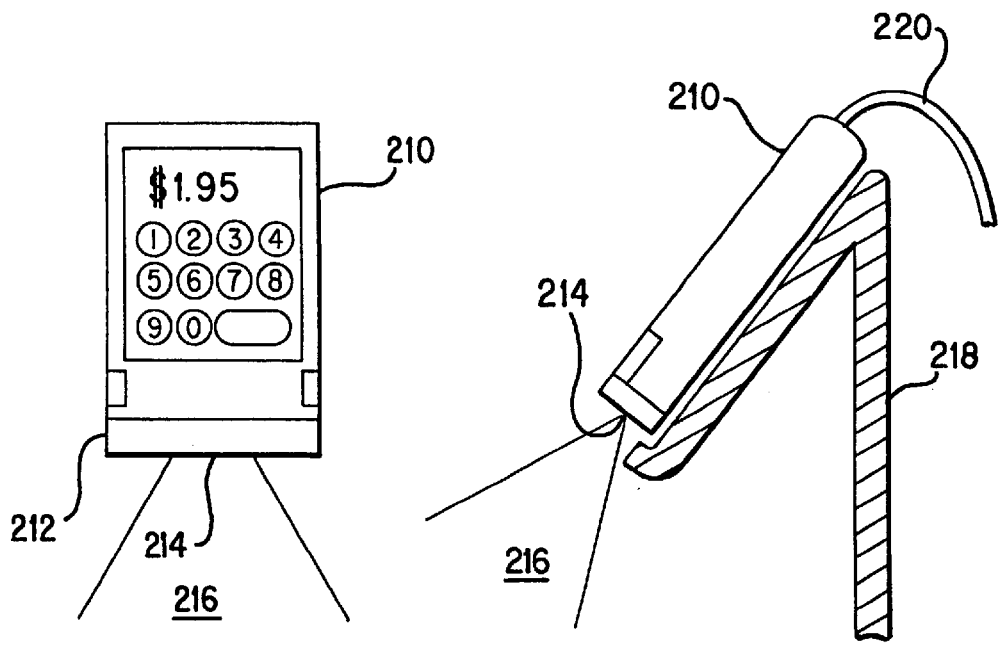
FIGS. 6(a) and (b) illustrate use of a hand held device such as a personal computing device, equipped with a scanning head or imager, in practicing the teachings of the present invention.

FIGS. 6(a) and (b) illustrate a PALM PILOT computing device 210 equipped with an optical code reader 212. A window of the code reader is located at 214. The numeral 216 identifies an emitted laser scanning pattern or a field of view of the code reader. The computing device 210 may be docked or affixed to a stand 218. When in its fixed mode as shown in FIG. 6(b), the device is capable of reading codes in a manner similar to a fixed OSM in a POS installation. The device is also capable of functioning as a hand held code reader.

The window of the code reader may be connected to the top of the PALM PILOT. Accordingly, the PALM PILOT may be configured to display data in an inverted mode as shown in FIG. 6(a) where the device is used as a hand held code reader. When placed on the stand 218 as in FIG. 6(b), the system may revert to its normal display mode when the field of view points generally downwardly.

The PALM PILOT device may be connected to a cash drawer, a credit card swipe reader, a smart card reader, a modem, a host computer or a receipt printer using a cable 220. The PALM PILOT device may also contain a price file or other similar application specific software or data. The power to the portable device may also be supplied from the cable 220 or alternatively provided with power through a socket when the device is docked. When undocked, the device may be operated on internal battery power. It is efficacious for the Pilot to recognize whether it is in a stand or out of a stand. As described above, if it is placed in a stand, the orientation of the display has to be inverted. There is no need for power conservation if the unit is placed in a stand connected to a power source; there is, however, a need for minimizing power consumption if the unit is operating with a battery. Several techniques may be used to sense docking of the device. In one technique, a magnet in the stand may be used to trigger an internal Hall effect sensor or reed switch in the detachable device. The detachable device can also detect a stand optically by detecting light reflected back to an optical sensor in the device by the stand. The device can further detect a stand when detecting the application of electric power or voltage which occurs when the device engages electrical contacts on the stand, or by sensing contact with the connector.

Mirrors may be employed to obtain more fields of view or aiming directions, particularly in systems with multiple fixed scan modules and a hand held code reader.

FIGS. 7(a) and (b) illustrate two examples of implementations involving a hand held code reader 230. In these systems, the hand held code reader 230 may be docked or otherwise positioned so that its field of view includes a mirror 232 or 232' located in a POS installation or code reading station. In FIG. 7(a) the operator positions the code reader in the side of the station 234 so that the field of view 236 projects upward through a horizontal window 238. An alternative embodiment is shown in FIG. 7(b) where the code reader 230 is pointed or docked downwardly into a side rail 240 near the operator. The field of view is deflected by the mirror 232' and projects generally horizontally through a generally vertical side window 242 of the system. It will be understood that other arrangements of the scanner dock, mirrors and windows may be employed to obtain various fields of view toward a scanning volume in various directions with a hand held code reader.

FIG. 8 illustrates another use of mirrors in order to produce multiple fields of view with a minimum number of scan modules or imager modules. The system includes a removable cordless hand held code reader 250, with a field of view 252 (when docked in the system) which covers the front of the scanning volume or a target object 254 therein. The hand held unit may be capable of recognizing and decoding many different types of code.

Laser beam scanners 256, 258 and 260 may also be provided. Advantageously, these devices may be single line or omni-directional scan modules. In another embodiment, the hand held unit is based on an imaging engine as described above. When the hand held unit is removed from its dock 262, the other scanners may be turned off. Alternatively, the laser scan heads may be alternatively turned on and off. In another alternative embodiment, the laser scan wavelengths may be different from scan module to scan module, and a system of band pass filters may be employed.

Mirrors 264 and 266 located above the scanning volume, may be used to provide a tunnel scanner with fields of view which cover the scanning volume. It will be understood that scan modules 256 and 258 must have a large depth of field or selectable depths of field in order to read code directly or to read code reflected by the mirrors 264 and 266.

In a preferred embodiment of the present invention, a two-window point of sale scanner is implemented using two scanning motors and two polygonal scanning mirrors. In such a case, each scan module has its own motor and polygonal mirror. Although this is a somewhat expensive configuration compared to all the single motor/polygon systems shown in the prior art, two motor/polygons in a Bi-optic scanner can provide increased scanning performance.

Single motor/polygon Bi-optic scanners need to position the polygon where it can be used to project scan lines out both windows. This position is not optimum for both (or either) window. The use of two motor/polygons allow the designer the freedom to place one in an optimum position for each window. This enables the projection of the best possible scan pattern from each window.

For example, a three-sided polygon may be best for the horizontal window, and a four-sided polygon may be best for the vertical window. The tilt of the faces on each polygon may need to be different to spread the scan lines apart a different amount as required for the best scan pattern for each system. The two motors may be positioned with different orientation of their axes of rotation. The motor driving the polygon that creates the scan pattern that scans out the vertical window may best be oriented with a horizontal axis. The other motor may be best if oriented vertically. It may be advantageous to run the two motors at different speeds to equalize the spot speeds generated by the two polygons.

It is also possible to position each polygon so that it projects out both windows, providing more scan lines and/or higher pattern repetition rate than can be created with one motor/polygon.

It will be understood that the use of two motor/two polygons provides many degrees of freedom to the scanner designer that are not available in single motor/polygon designs.

The two polygons can scan laser beams produced either by two individual lasers, or the beam of a single laser can be split with a beam splitter allowing the two polygons to scan beams originating from a single laser. If desired, each polygon can scan more than one beam. Each beam can be produced by a separate laser or beam splitters can be used. Conventional bi-optic scanners are capable of scanning symbols on four or five sides of a package. The use of two motors and two polygons provide improved scan pattern coverage.

III. Modular Construction: Electronic Integration of Multiple Laser Scanner Modules or Imager Modules In preferred embodiments of the present invention, a POS installation or code reading terminal is provided with plural module stations, each having electrical couplings and mounting structure adapted for receiving a scan module or imager module. These features permit customization or upgrading of the installation or terminal. The installation or terminal may further include circuitry or software for automatically detecting and configuring by the system. The detection mechanism can be implemented by mechanical switches, electro-magnetic switches, or software protocol where each modules identifies itself to the system upon power-up.

Figure 9A:
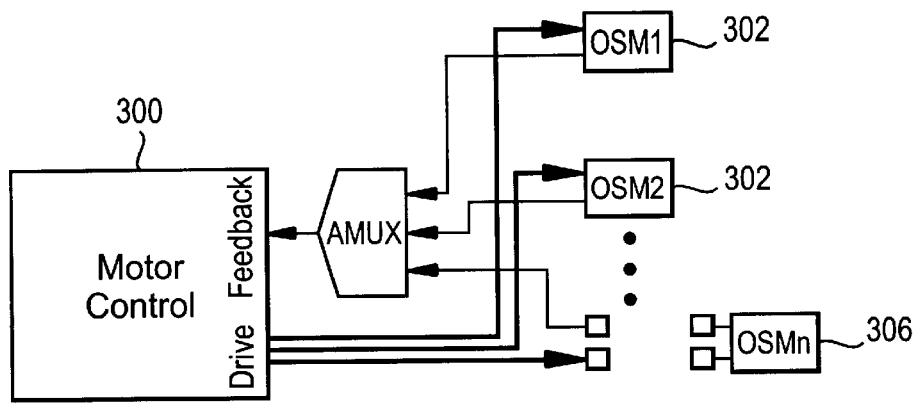
FIGS. 9(a), 9(b) and 9(c) are schematic block diagrams of systems for integrating multiple imaging or scanning modules in accordance with preferred embodiments of the present invention.
Figure 9B:
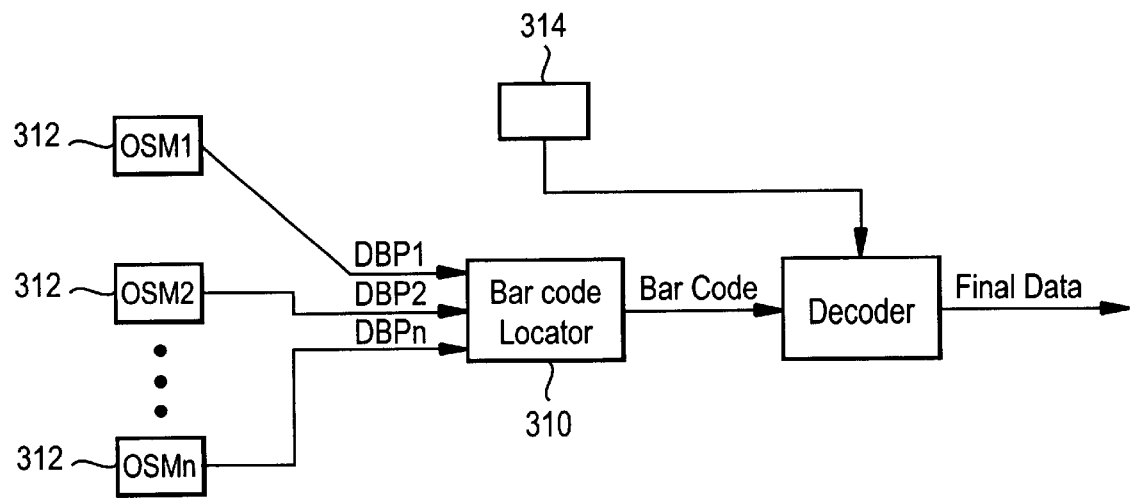

In order to obtain efficiency, in terms of lowering costs, each scan module (e.g. OSM) or imager modules may consist only of optical elements and signal receiving and digitizing electronics. The remaining control system "backbone" may consist of the motor control and decoding sub-systems. In a preferred embodiment, the motor control electronics generate different "optimum" patterns for different OSMs depending on the plane that is to be scanned. This feature adds negligible cost to the motor control system since all of the flexibility will be achieved via adaptive software controls. As depicted in FIG. 9(*a*), the motor control unit 300 may fan out the control signals for each scan module 302.

The feedback signal is used to monitor and update the scan pattern variations with temperature or other perturbations. The signal may be multiplexed back into the motor control unit 300. Once the software functions for generating the basic scan pattern are established, generating variations for each OSM separately will cost little extra processing power and will require little or no additional electronics. When a new OSM 306 is added to the system, its location will be relayed to the motor control so that the appropriate scan pattern can be generated.

Multiple streams of digital bar patterns (DBPs) may be produced by the various laser scan modules or imager modules.

In a preferred embodiment, a hardware circuit for each module filters data to output data identified as candidate optical code or fragments thereof. Data output by the filter is presented to a central decoder in the order it arrives. As soon as a decode occurs, regardless of which scanner it came from, the system will provide an indication of decode (e.g. a "beep") and the decoded data will be transmitted.

Alternatively, the system must prioritize the stream to which the decoding algorithm is to be applied. This implies that it must quickly determine the stream that is most likely to have bar code data before attempting to decode it. This should be done at a computation speed such that the system can keep up with the data rate.

Before attempting to decode any bar code, its symbology type is first identified. For imager modules it can be implemented in the manner described in patent application Ser. No. 09/096,578 referenced above. For OSMs, this portion of the algorithm is relatively small compared to the rest of the decoding algorithm. For OSMs, it can be implemented in hardware at a relatively low cost for achieving a very fast identification. Each stream of DBP data can then be captured in a finite size buffer and funneled through the bar code identifier hardware.

As shown in FIG. 9(*b*), a bar code locator 310 receives DBP signals from the various OSMs 312. This logic block will determine which stream contains a valid bar code and then direct the stream to the decoder while identifying its symbology type in the process. This concept is depicted in FIG. 10. It can also be accomplished via a conventional IC filter to identify a signal having a potential or likelihood of being an optical code. The tradeoff between implementing the bar code finder block as hardware or software may be evaluated by considering desired system speed and cost. Another approach is to coalesce pieces of the bar code from different scan sources as described in U.S. Pat. No. 5,495,097, the contents of which are incorporated by reference.

An imaging engine 314 is provided as an additional bar code reading module. Such an engine may implement auto-discrimination algorithms described in the above-mentioned patent application to identify the presence and code type in the image. Alternatively, the imaging engine may be a free standing unit with its own decoder.

This implementation of a multi-planar scanner using OSMs will have the cost advantage of using a single motor control and decoder for all the units. The cost per added plane or field of scanning will primarily be the cost of adding an OSM without a decoder and motor control.

Figure 9C:
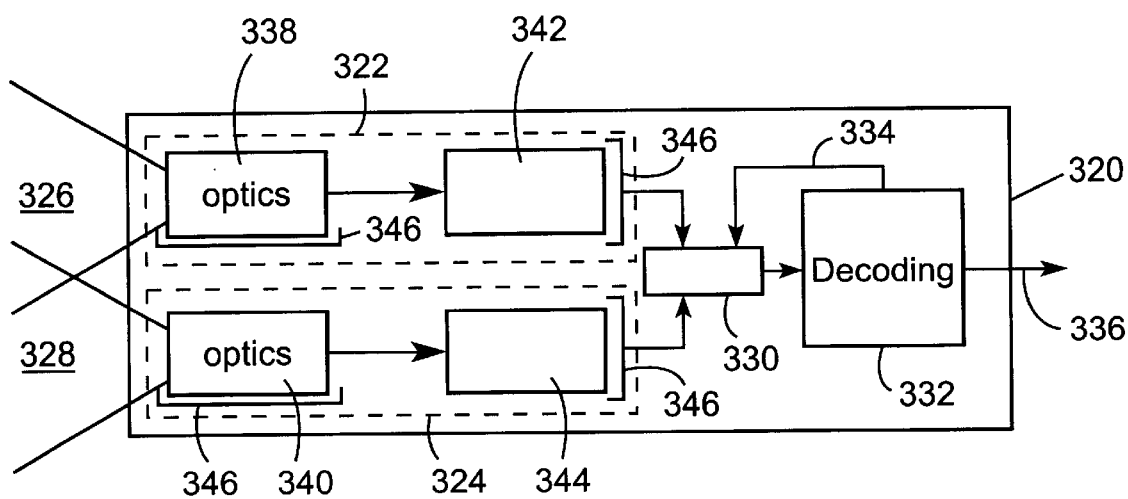

A further variant of the modular design aspects of the present invention is illustrated by the embodiment of FIG. 9(c). A housing such as for a rail scanner, portable or hand held scanner is indicated by the numeral 320. The housing contains two (or more) code reading heads 322 and 324 having different capabilities. In the illustrated embodiment the head 322 is shown as having a wider field of view 326 than the field of view 328 of the head 324. It will be understood that other differences in capabilities may be provided by appropriate selection of specialized code reading heads, such as different effective ranges, field depths, aiming angles, type of code read (e.g. PDF vs. UPC), or type of readers (e.g. laser beam scanner as imager).

Output signals from each head are selected or prioritized at functional block 330, which may be implemented in hardware and/or software. An attempt is made at decoding the signal as indicated at functional block 332. A decoding failure may initiate a call for data from the other code reading head as indicated by feedback loop 334. A successful decoding results in an output signal 336 containing final data.

Further modular aspects of the system of FIG. 9(c) will now be described. Each of the code reading heads 322 and 324 contains an input optics module (338 and 340, respectively) and a sensing/scanning module (342 and 344, respectively). Each module is a selectively includable module as indicated schematically by the receiving or docking structures 346. Thus, for example, a long range and a short range laser beam scanner head could be implemented by appropriate selection of input optics modules 338 and 340. Alternatively, a short rang code reading head at 322 could be implemented by selecting the optics and sensor electronics associated with a CCD-based bar code imager.

Figure 10A:
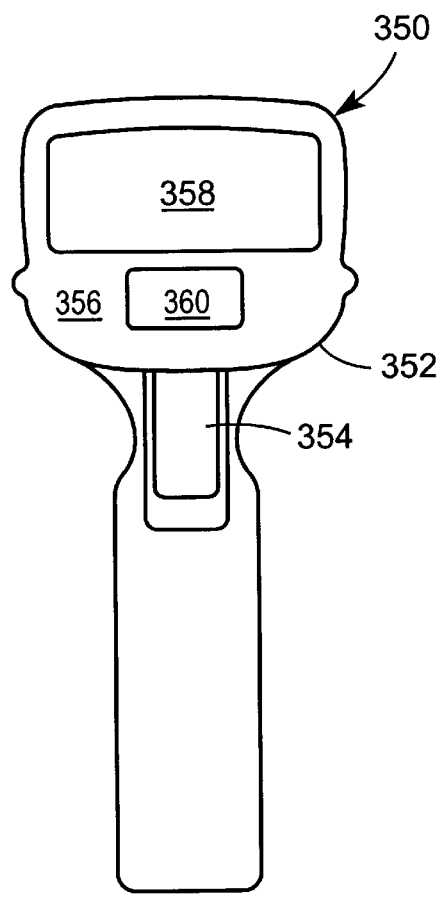
FIGS. 10(a), 10(b) and 10(c) are, respectively, front, side cross-sectional and plan views of a hand held scanning unit containing two different scanners.
Figure 10B:
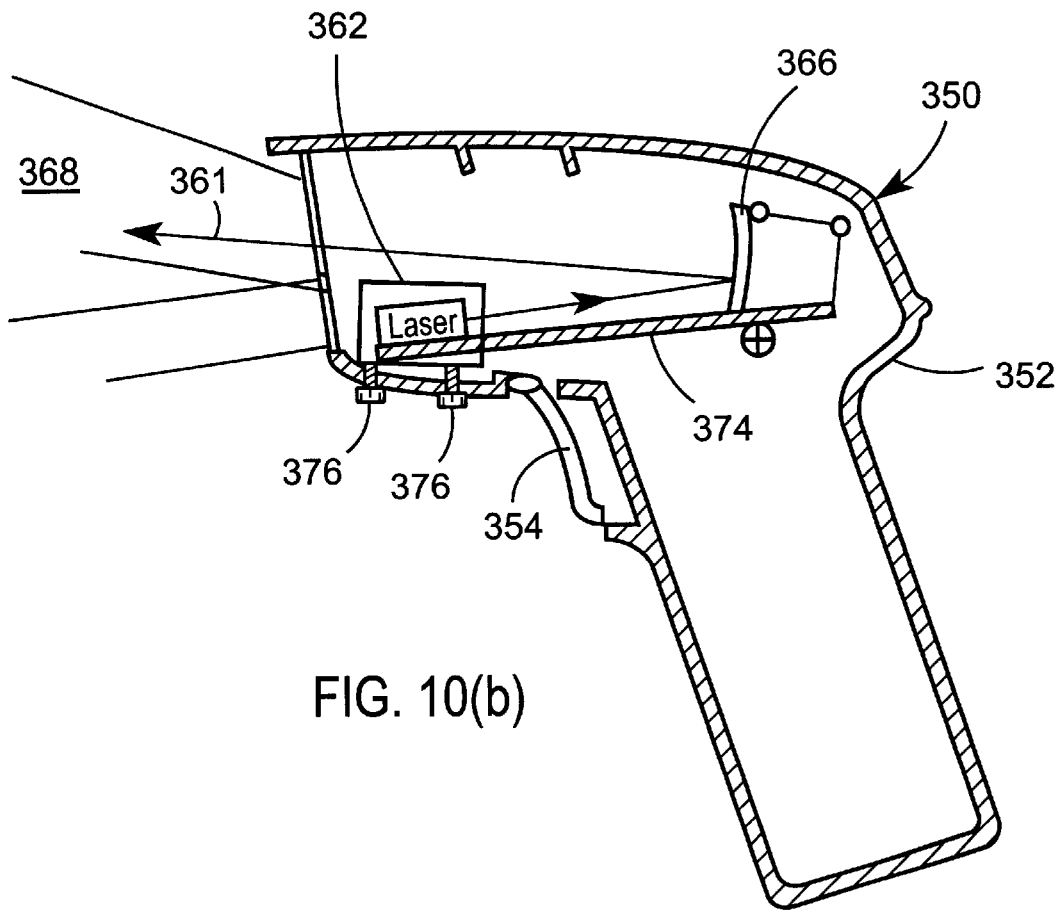
Figure 10C:
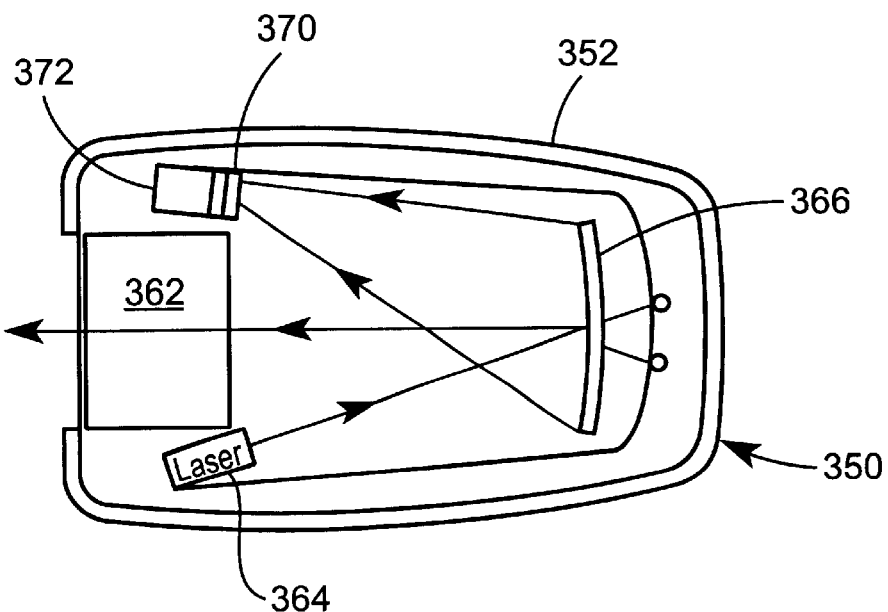

FIGS. 10(a), (b) and (c) are, respectively, front, side-cross sectional and plan views of a hand held bar code reader 350, illustrating certain aspects of the modular design teachings of the present invention. The reader 350 includes a housing 352 adapted to be gripped by the hand and a trigger 354 for initiating aiming or code reading functions. A front face 356 of the reader may include two windows 358 and 360. A larger laser beam scanning apparatus projects a scanning beam 361 through the window 358 and receives reflected returns through that window. A smaller code reading module 362 (for example of the 1200 size, known in the art) is located behind the window 360. The module 362 may be, for example, an imaging engine, a PDF code laser beam scanner, or more generally, a code reading module with capabilities different than those of the larger laser beam scanner operating through the window 358. The aiming directions of the larger scanning system and the module 362 may be approximately the same.

In preferred embodiments the larger laser beam scanner, operating through the window 356, may include a laser 364, and a moving mylar mirror 366 for directing the laser beam through a scanning field 368. Advantageously, the mirror 366 is a large mirror with at least a one square inch surface area to improve the signal to noise ratio of the system. Returning laser light may be reflected off of the mirror 366 through a filter 370 to a photo detector 372 which produces an electric signal responsive to the returning beam. The components of the large laser beam scanner 364, 366 and 372 may be located on a circuit board 374. The code reading module 362 is located between the laser 364 and the photo detector 372. It may or may not be mounted on the circuit board 374. The module 362 is detachably mounted in the hand held reader 350, as indicated by fasteners 376. In preferred embodiments, the module 362 may be inserted in a plug or dock and share signal processing and control circuitry with the other scanner. Various types of modules could be installed or substituted in the place of module 362.

An example of the operation of a preferred embodiment of FIGS. 10(a), (b) and (c) will now be described. A module 362 is selected and installed to provide near range scanning, the larger scanner being employed for longer range/wider field scanning. Activation of the trigger 354 would cause the module 362 to scan and the other scanner to project an aiming pattern. If a bar code is detected by the module 362, decoding would be attempted and the process completed if decoding is successful. A failure of the module 362 to detect a bar code or produce a decodable signal, would be taken as an indication of target range (i.e. the target bar code is at a longer range) and scanning using the larger scanner would be initiated.

Figure 11:
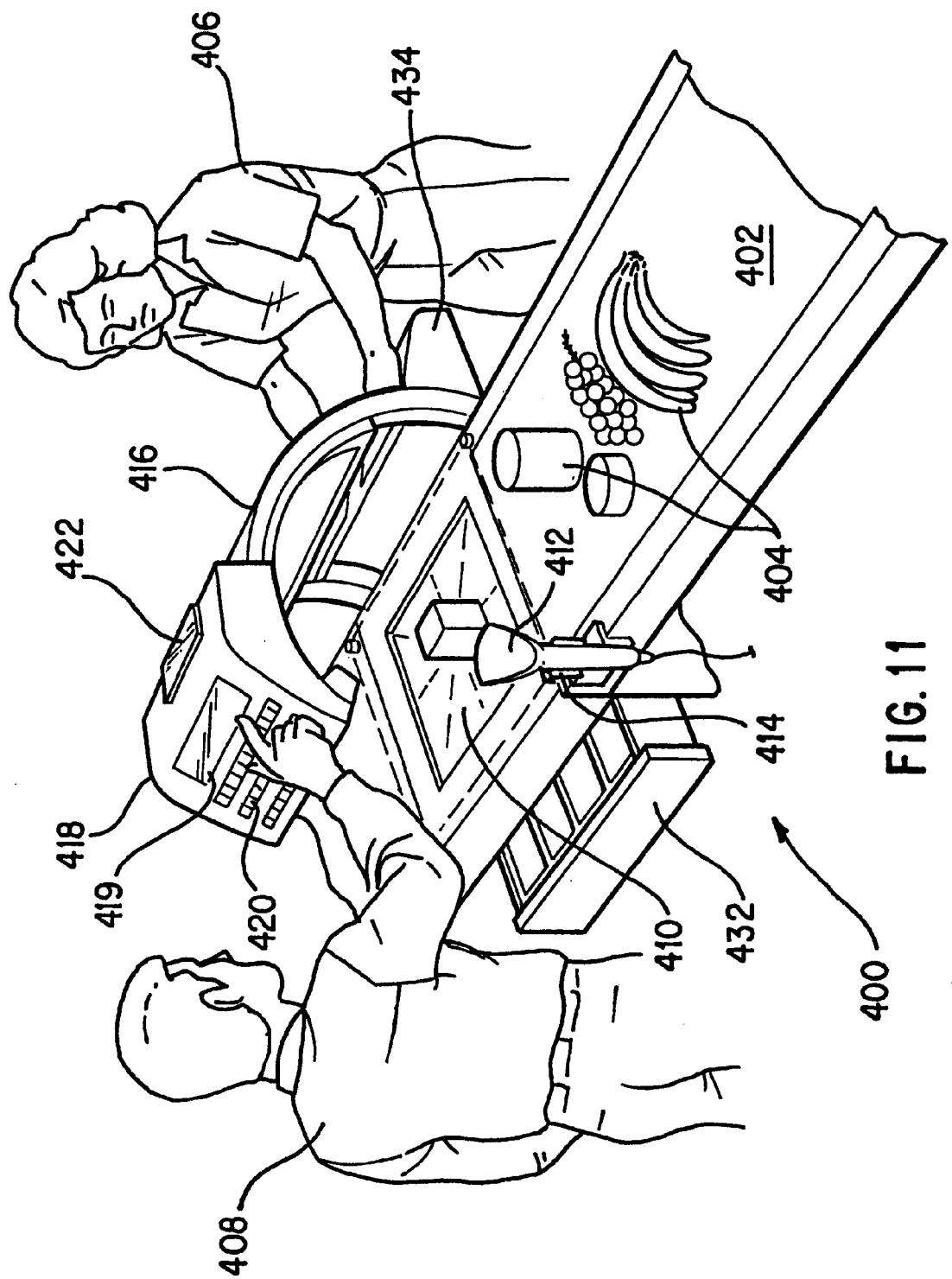
FIG. 11 is a pictorial view of a point of sale illustration including a code reading system with multiple fields of view illustrating various aspects of the present invention.
Figure 11A:
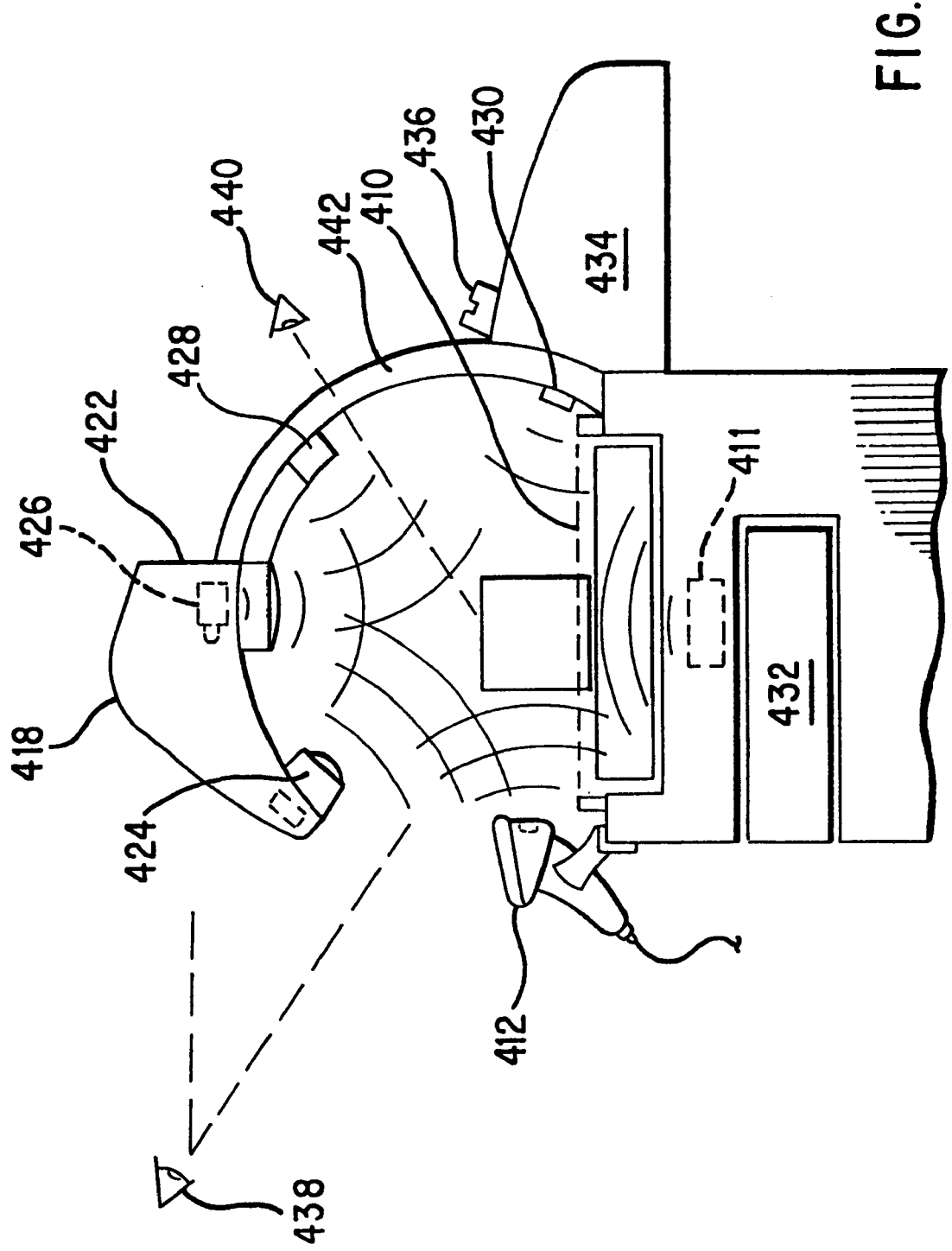
FIG. 11(a) is a side view of the illustration of FIG. 11.

IV. Ergometric Designs for Point of Sale Code Reader Systems with Multiple Fields Of View A customer checkout station or POS system 400 configured according to an exemplary embodiment of the present invention is illustrated in FIG. 11. FIG. 11(a) is a side cross-sectional view of the checkout stand of FIG. 11. The customer checkout stand includes a conveying means 402 on which a plurality of articles 404 are transported between a customer 406 and a system operator or checkout clerk 408. The articles are conveyed to or moved by the operator onto a horizontal scanning window 410 where a code symbol affixed to the articles may be scanned by one or more of a plurality of scan modules 411 under the window. For example, a plurality of OSMs may be located beneath the horizontal scanning window 410 as discussed above. A hand held unit 412 may also be provided which can read codes from a fixed dock 414 or which can be detached and used to access codes on articles that are either too large for the conveying means or too heavy. The hand held scanner can be omni-directional without an internal decoder. The scanner may share the slot scanner's decoder. The hand held scanner could be operated by a trigger. A trigger pull could, for example, turn off the laser in the slot scanner, turn on the laser in the hand held scanner and switch the input of the decoder to the hand held unit instead of the slot scanner. Alternatively, the hand held scanner could be set to run continuously. It could be positioned so that, when it is rested in its holder, its scan pattern can supplement the patterns of the slot scanner. Actuation of the hand held scanner may also deactivate the horizontal and vertical windows so as to facilitate scanning by the hand held scanner exclusively as in cases where the produce is not located on the conveying means due to its size or weight. Above the scanning window 410 and attached to the stand at a side away from the operator is a substantially semicircular hood or partial arch 416 that forms a tunnel over the conveying means 402. The hood may include an input/display terminal 418 visible to the operator and at a convenient working height for the operator to observe the display 419 and to input information on a keypad 420. A second display 422 may be used to display information to the customer such as item price, product information, discounts, etc.

The hood or arch may also house optical code readers or modules 424, 426, 428 and 430. These code readers may be located within the hood on the back of the display terminal (424 and 426) in the arch (428) or at the base of the arch 430. Generally, the fields of view of these code readers are directed towards the conveying means to provide a substantially complete coverage of an article as it moves through the checkout stand. The hood may prevent very large objects from passing through a fixed scanning volume of the system. However, such large objects may be scanned by the hand held unit.

The checkout stand 400 may also include a cash drawer 432. The hood may also have attached to it, on the customer side, a check writing stand 434 with a credit card reading device 436 located thereon.

Additional aspects of the present invention will be more apparent from the side cross-sectional view of FIG. 11(a). The Figure illustrates the scanning field of views of the various code readers and modules. The viewpoints of the operator and customer are suggested by the eye symbols 438 and 440, respectively. It will be observed that where the hand held unit 412 is not a laser scanner, that no laser scanners are directed toward the eyes of the operator or customer. In addition, it will be observed that the operator has a clear view of the input/display terminal 418, of the scanning volume and conveyor, and of the hand held unit 412 and cash drawer 432, when open. The customer is provided a clear view of the display 422, the surface of the check writing desk 434, and of the articles in the scanning volume through a window 442 in the arch.

V. Code Reader Systems Including Side Rail-Located Code Readers or Windows

Other embodiments of the present invention incorporating multiple scan modules or imager modules are illustrated in FIGS. 12(a) and (b). The horizontal scanning window 500 may overlie a plurality of OSMs 502, 504 and 506, each projecting laser beams at different angles. One scanning window 508 may be located on the customer side. Another vertical scanning window 510 adjacent to an operator may also be included in side rail 512. This second vertical scanning window 510 may include an OSM. It has been found ergonomically acceptable to have a side rail as much as two inches high next to the operator. Alternatively, the code reading function may be provided as shown in the Figure by a docked hand held unit 514 and the mirror arrangement previously discussed in connection with FIG. 7(b). The window 510 may be smaller in height than typical vertical scanning windows used on the customer side in conventional scanners. This is made possible by locating the window several inches from the near edge 516 of the horizontal window 500. This enables the laser lines projected upwards from the lower side window adequate space to travel upwards so that by the time they are over the horizontal window, they are high enough above the counter top surface to scan symbols that are several inches high on the side of a article that is being transported across the horizontal window 500.

Ergonomic studies have shown that the horizontal window of a slot scanner should be located several inches from the operator so his or her hands can easily pass over it without either reaching too far or having to step back. Horizontal windows in slot scanners are typically positioned with their centers about 8 to 10 inches from the counter top edge closest to the operator. This is an adequate distance for the projected lines of the side window to achieve a sufficient scanning height.

Figure 12B:
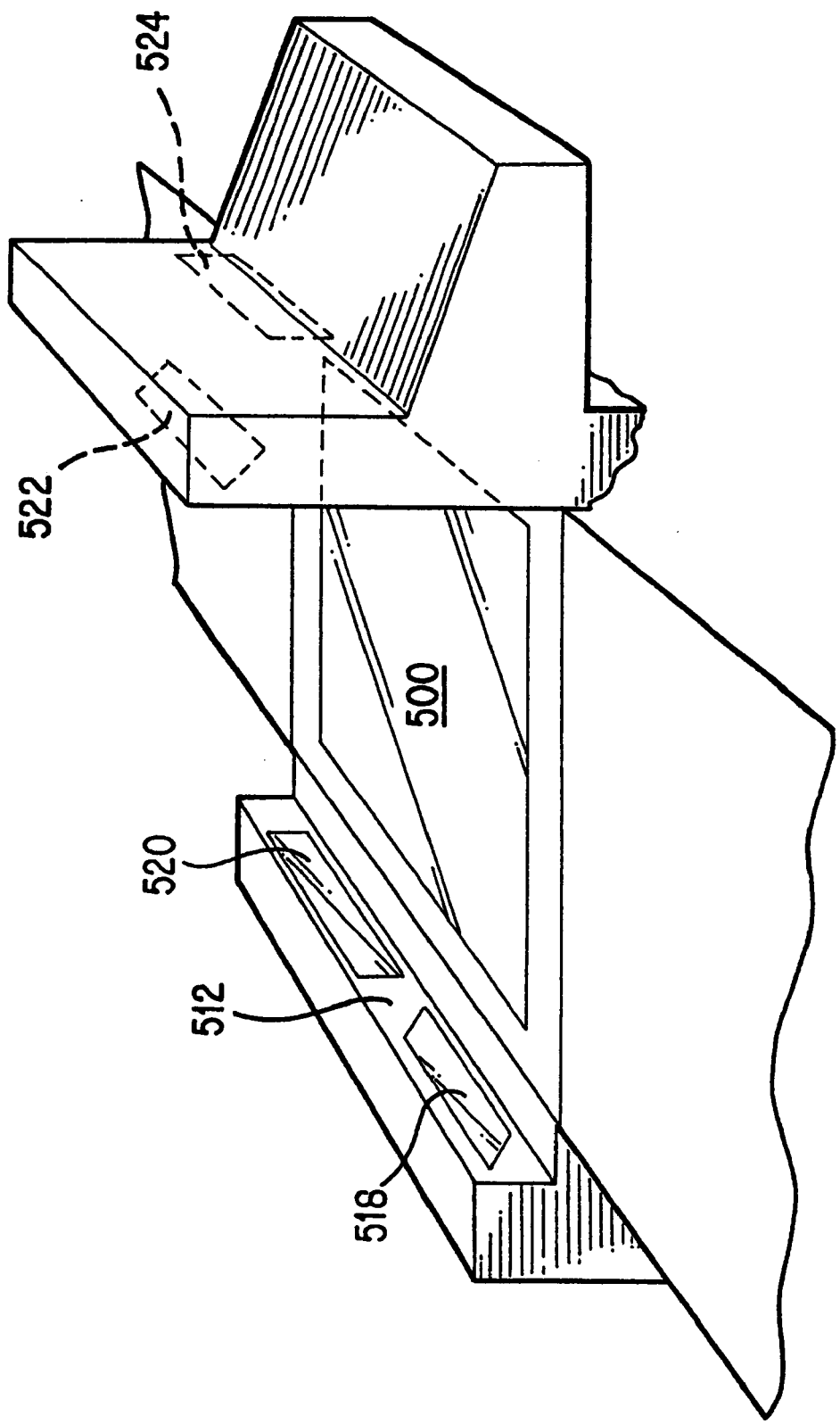

The installation of FIG. 12 may be implemented in several ways. Side scanning can be performed by scan engines independent of the scanning mechanism used under the horizontal window 500. For example, as shown in FIG. 12(b), two OSMs 518 and 520 are positioned close to the operator, having their beams directed across the horizontal window could be used. One OSM module 520 could scan symbols close to the counter top (i.e., lower on the package), the other engine 518 could be aimed at angles inclined with respect to the horizontal surface 500 to scan codes that are higher up.

Laser lines emitted from the horizontal window and from the side window could be generated by a single laser, polygon and several mirrors, much like conventional two window scanners. If desired, far side (i.e., side closest to the customer) reading could be supplemented by two OSMs 522 and 524 mounted at the opposite side of the counter, far from the operator, creating an inverted tunnel code reader.

A conventional two window scanner that scans with a side window in a housing on the customer's side could be upgraded by adding OSMs to scan from the operator side. For less demanding environments, all scanning could be performed by OSMs in a low housing close to the operator, scanning the side of the package facing him. In this case, no horizontal window would be required.

A slot scanner with a small raised portion next to the operator, as opposed to a large raised portion far from the operator has additional advantages. Articles moving along the conveying means towards a conventional scanner have a tendency to jam against the raised vertical scanning window. As this occurs at a side closer to the customer, it is difficult for the operator to reach in order to clear the jam. With the implementation according to an exemplary embodiment of the present invention, however, the part of the scanner that blocks article flow is much smaller resulting in a reduction of the frequency of jams. If a jam does occur on the other hand, it is easy for the operator to access and clear the jam.

As discussed below, a side rail 512 near the operator is also an ideal location for locating indicator lights, a volume control for a beeper tone or audio signal selector or a display for a weighing scale that is present in checkout stands.

The scan modules in the rail that reads symbols on the side closest to the operator can provide good scanning throughput even when used without an additional scanning window. Throughput can be improved by adding another scanner in the rail opposite the operator to read symbols on the opposite side. In addition, scan engines in each rail can be aimed upstream and downstream to scan the leading and trailing sides of objects.

Eliminating the modules in that scan upwards through a horizontal window enables the conveyor to extend past the rail mounted scanners, eliminating the need for the operator to push every item over the scanner.

Alternatively, rail mounted scanners make it easy to place a scale in the check stand without integrating it into the scanner or placing it under the scanner. Avoiding integrating the scale and scanner makes it possible to provide one model scanned to be used with or without the scale. Avoiding locating the scale under the scanner leaves room for operators to fit their knees under the counter. Finally, elimination of a scanner aimed up through a horizontal window makes room for a cash drawer. Also, a rail containing scan modules can be combined with check writing surfaces, credit card readers, scale displays, cash register displays, and keyboards.

VI. Two-Component Focusing

When creating a bar code scanner, a laser beam has to be focused in order to maximize working ranges for different bar code densities. Typically, focusing is achieved by using a focusing lens and aperture. Three variables have to be optimized: lens focal length, distance between laser and lens, and aperture size. Using only these variables, there are significant limitations. For example, miniature scanners have a small internal optical path and use lenses with small focal lengths. Therefore, there may be a large dead zone at the scanner nose, and there may be significant laser beam pointing error due to laser chip lateral shift. Secondly, 2-D scanners using small lens aperture (round or square) suffers from lack of laser power throughput.

The two-component focusing described below is intended to improve scanner performance without increasing its costs or complexity. It is shown below that the two-component focusing can significantly improve laser power throughput (most critical for long range application), or increase the internal optical path from system exit pupil to scanner nose thereby decreasing dead zone of a scanner (most critical for miniature scanners), or increase system effective focal length to decrease laser beam pointing error (helps to increase collecting area and decrease collecting field of view).

Figure 13A:
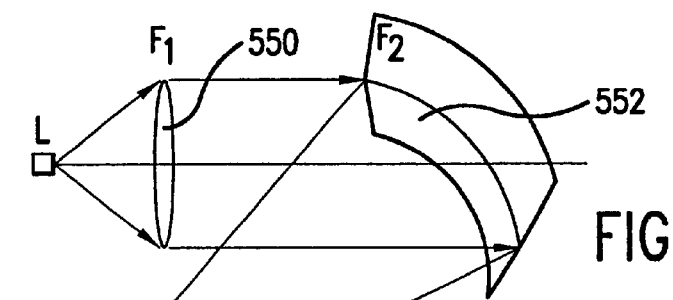
FIGS. 13(a)–13(g) are schematic diagrams illustrating two component focusing performed in accordance with preferred techniques of the present invention.
Figure 13B:
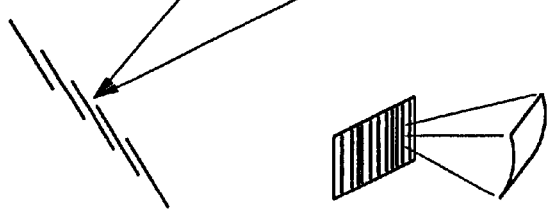

FIG. 13(a) shows an embodiment of focusing techniques using a curved scan mirror. It is known that cylindrical mirrors with curvature in vertical direction (along bar codes) as shown in FIG. 13(b) can improve beam visibility and performance on poor quality symbols. Such mirrors are curved in a horizontal direction in order to provide focusing consistency during scanning.

Figure 13C:
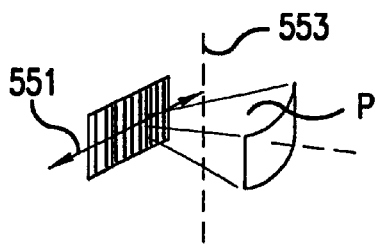

The present techniques may use a mirror with curvature perpendicular to the scanning direction indicated by the double headed arrow 551 in FIG. 13(c). In a preferred embodiment, this may be a cylindrical curvature about an axis 553 perpendicular to the scanning plane P.

Referring to FIG. 13(a), a laser beam from laser L (typically a solid state laser chip) is pre-focused by a conventional lens 550 having focal length $F_1$ and then focused by a curved scanning mirror 552 having focal length $F_2$. Mirror 552 may be a moving mirror with an optical power. Note that the cost of scan mirror with curved surface is about the same as that for conventional flat mirror when made molding plastic. Focal length $F_2$ can be positive (as shown) or negative depending on desired performance trade-off. Focal length $F_2$ depends on scan angle SA:

$$F_2 = F_{20} * \cos(SA/2),$$

where $F_{20}$ is focal length at the center of scan line. It is a matter of design to ensure that focusing changes during scanning are smaller than focal length of the first element 550 (focusing lens):

$$EFL < F_1.$$

Figure 13D:
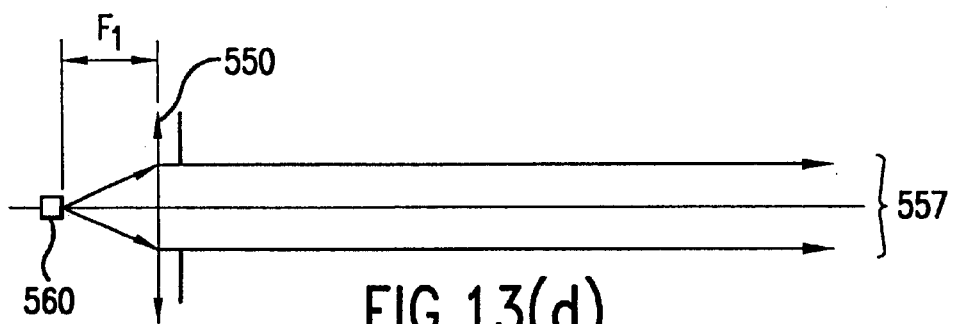
Figure 13E:
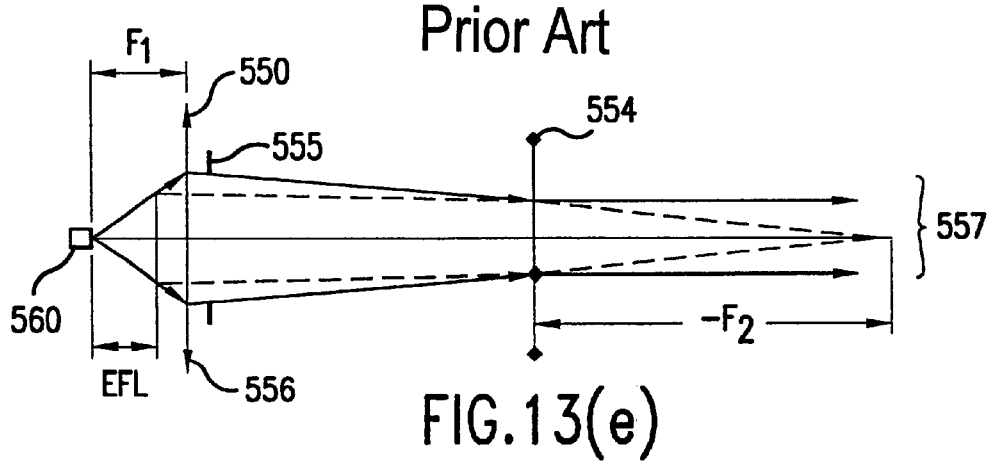

Correspondingly, laser power throughput will be increased relative to the conventional system shown in FIG. 13(d) and having the same beam focusing on the bar code. Note that one could achieve the same result by using a lens with smaller focal length. However, there is an advantage of using curved mirror because one still can use a standard focusing lens providing minimum price of the system. It will be understood from FIGS. 13(d) and 13(e) that the physical separation between the laser chip 560 and the pre-focusing lens 550 is greater in the embodiment of the present invention (FIG. 13e) than in the conventional arrangement (FIG. 13d). This increased separation can be used advantageously in the design of the components. The negative power mirror 554 has the effect of minifying the physical aperture 555. The entrance pupil of the system of FIG. 13(e) is larger than that of the system of FIG. 13(d). However, the actual exit pupil 557 of both systems is essentially identical.

Figure 13F:
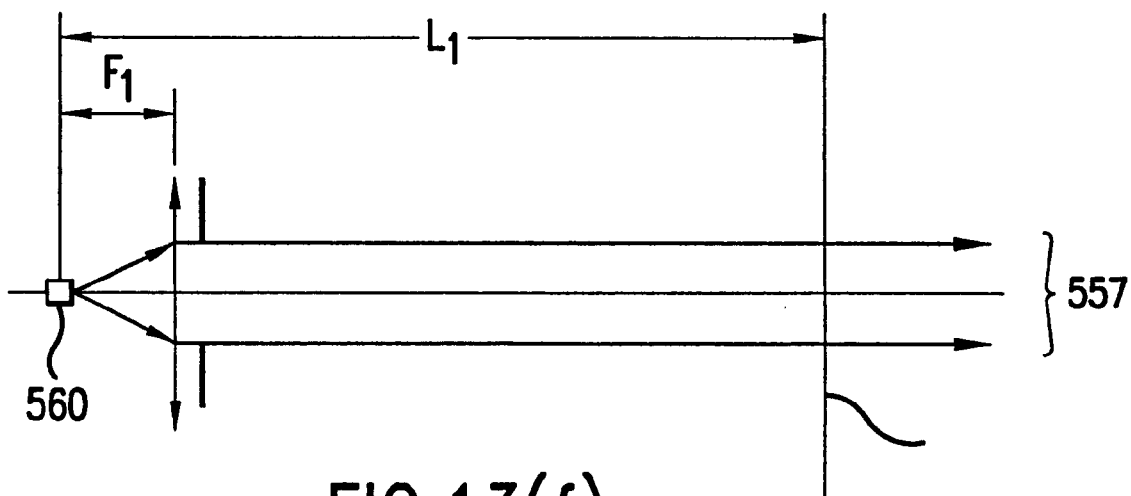
Figure 13G:
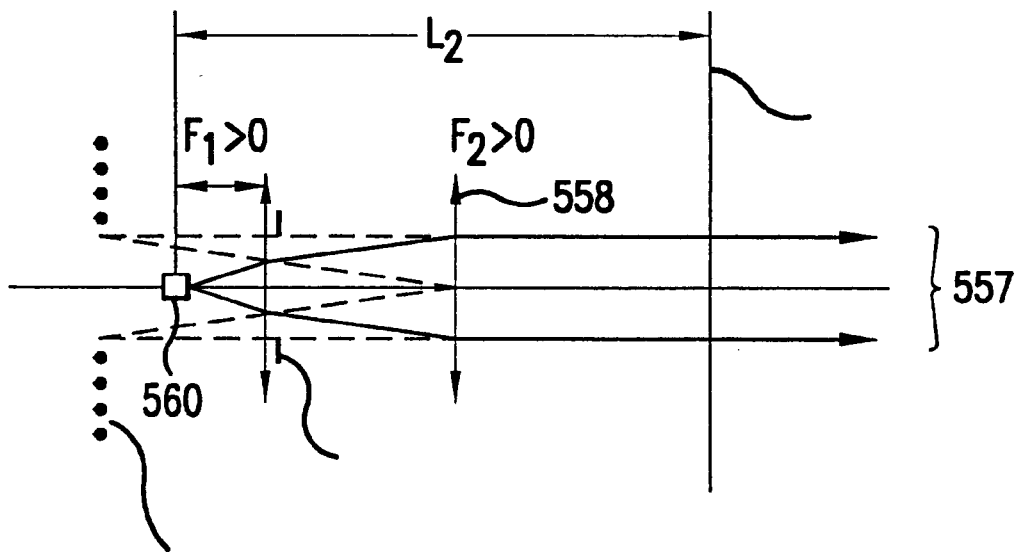

In FIG. 13(g), a convex mirror is represented by equivalent negative lens $F_2 > 0$. The result is that the pupil is shifted significantly back from the scanner nose. Therefore, the system will provide large internal optical path. Therefore, decreased dead zone of scanner working range will be achieved as compared to a conventional system shown at FIG. 13(f) and having significantly larger dimensions. Another advantage of the proposed system is increase of effective focal lens. Therefore, laser beam pointing error due to lateral shift of laser chip 560 will be significantly decreased.

The systems of FIGS. 13(f) and 13(g) have essentially the same exit pupil 557. However, the use of the positive optical power of the second optical component (e.g. curved scan mirror 558) increases the internal optical path. This result is reflected in the reduced physical distance between the laser chip 560 and the scanner nose i.e. $L_1 > L_2$. Consequently, the optical system of FIG. 13(g) is physically shorter in length while providing the same effective internal optical path, working ranges and exit pupil.

VII. Audible Signals for Code Readers

An audible signal (usually a beep) is conventionally used in code reading systems to indicate to the operator that a symbol has been read. Preferred embodiments of the present invention include improved signaling techniques which better communicate information to the operator.

With this implementation, a lower signal volume can be used in contrast to other scanners which have signal enunciators mounted under the counters. A lower sound volume reduces the noise level in a store. The signal volume may also be automatically adjusted to take into consideration the ambient noise level which may vary during the day. For example, when the noise level is higher during peak shopping hours, the volume of the signal enunciator may be adjusted upwards.

In preferred embodiments, multiple audio enunciators (transducers or speakers) with different frequencies (beepers or speakers) may be integrated into optical code reading or point of sale systems to produce different sound combinations, stereo effects, and/or higher sound volume. Multiple enunciators have the capacity of producing a much higher sound volume at the same frequency. In addition, multiple enunciators can be employed to produce sounds having different phases and/or frequencies to give each station a unique audible signal. These signals may be user defined to give a particular station or scanner a signature which is unique as compared to nearby units. Multiple enunciators can also be used to produce stereo effect with different phases and/or frequencies for different types of optical code (i.e. different signal for a UPC code than for a PDF code). The enunciators may be used to reinforce and direct the sound. The audible signals may also indicate function changes in the reader system (e.g. switching of the code reading mode from one dimensional to PDF or to OMNI modes). Optical codes may be provided to the user which, when scanned, program the audible sound system for providing different sound effects.

Figure 14A:
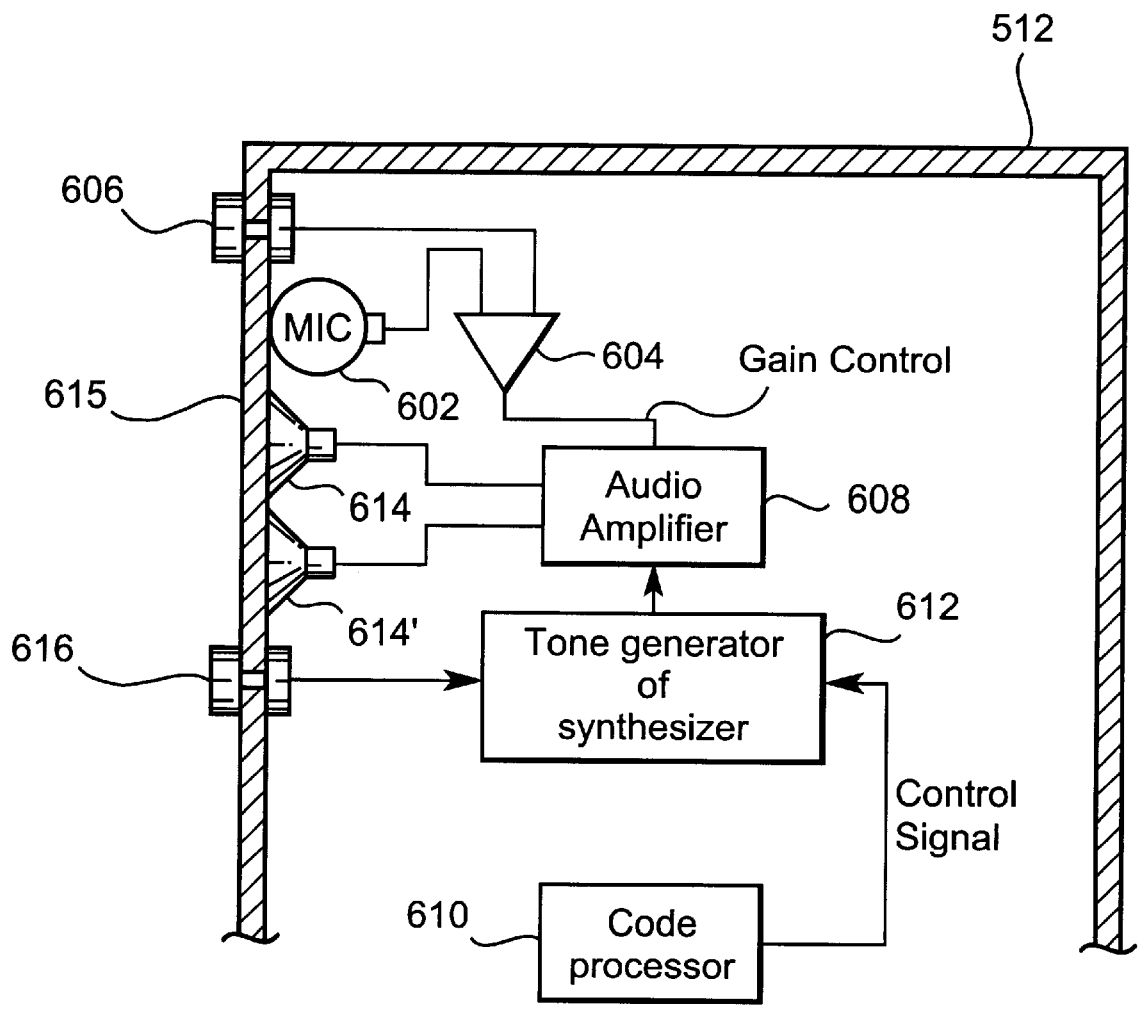

An adjustable volume audible signaling system may be implemented as illustrated in FIG. 14(a). A microphone 602 is used to detect ambient noise. A signal from the microphone is compared in a comparator 604 to a preset or threshold value which may be manually set by the operator by adjusting a sensitivity control 606. The output of the comparator determines the gain of an audio amplifier 608. The threshold for each volume setting may be set at a particular decibel level above or below the measured level.

A code processor 610 processes the read code and triggers a tone generator or synthesizer 612 to produce one or more signal waveforms. The waveform is amplified by the amplifier 608 to produce a sound which is emitted by one or more audible enunciators such as speakers 614 and 614'. In an alternative embodiment, the same electro-mechanical structure may be used on a time-shared basis as both microphase and enunciator.

The speaker may be pointed in a direction to make the signals easily audible to the operator. It is preferable to position the speakers on vertical surfaces or under overhangs so that spilled materials will not foul the speaker. As shown in FIG. 14a, the speakers and microphone are located in a housing wall 615 of a raised side rail 512 such as shown in FIGS. 12(a) and 12(b), located between a horizontal work surface and the system operator.

A beeper with multiple distinct beeps may also be incorporated into the scanning system of the present invention. This type of beeper may be used for scanning two different code symbologies in one trigger pull. The Uniform Code Council (UCC) is preparing a new specification for adding supplementary information, in addition to the uniform product code (UPC), to certain items such as pharmaceuticals. The UPC identifies the product and the new specification enables a second code to represent, for example, a batch number or an expiration date, of pharmaceuticals. Accordingly, two symbologies have to be scanned, with one being a 1D symbol and the second being a 2D symbol appearing immediately above the 1D symbol. The beeper of the present invention may produce one beep to indicate that the 1D symbol has been scanned and a second beep, distinct from the first, to indicate that the 2D symbol has been scanned. In addition, more sophisticated and differentiated sound signals may be provided. For example, the code processor could be configured to select a sound waveform indicative of the nature of the product whose code symbol had been read, for example, an enunciated "moo" or the word "milk" when the product scanned is milk. The audio signal may be manually selected using the selector 616 or controlled by an output control signal from the CPU of the system.

Turning to FIG. 14(b), a process for providing audible signal in response to the detector of multiple bar code symbols proceeds as follows. An attempt is made to locate scan data at 622; if the data is not located at 624, control returns to 622. A decode attempt on a 1D symbol is made at 626. If additional data is not located (i.e., the decode is complete) at 628, control proceeds to 630 which causes a low-frequency beep, indicating the reading of a 1D symbol and control proceeds to 632. If 1D decode fails at 628, a scan attempt of decoding a 2D symbol is made at 622. If both symbols have not been decoded, control returns to 634. A successful scan of the 2D symbol causes a high-frequency beep, indicating the reading of a 2D symbol and control proceeds to 632. A determination is made at 632 as to whether both the 1D and 2D symbols have been decoded. If the result is failure to decode both symbols, control returns to 622. If both symbols have been decoded, a third type of beep, of a user-selected frequency, is emitted and the decoded data is transmitted to a processing system. The decoder, therefore, will beep twice during the decode attempt of a mixed 1D–2D hybrid symbol, such as MicroPDF code above a UPS-A code or code 128 linear symbol.

A scanner that can be used for this purpose is the LS-4804 rastering laser scanner that can read MicroPDF417 and 1D bar codes. An alternative is the imaging apparatus disclosed in U.S. patent application Ser. No. 09/096,578 referenced above. Distinct decode beeps may be emitted as the decoder recognizes and decodes each part of the hybrid. The operator can determine, after the first beep, that one symbol has been decoded and, in addition, the type of symbol that has been decoded so that he or she can concentrate on scanning the symbol that has not been decoded. This approach is more effective if the two symbols of the hybrid are visually distinguishable.

VII. Integrated Weighing Systems

It is known to incorporate single window scanners into a weighing system platen, so that bar code reading and article weighing may be done in an integrated fashion.

It is also known in conventional checkout stands to employ both a bi-optic scanner and a platen for weighing items at the end of a conveyor. This approach has the disadvantage that the products on the platen may lean against a vertical window or housing of the scanner and cause the system to give falsely low readings. It has been proposed to use an "L"-shaped platen for weighing goods in supermarkets. The asserted advantage of such a device is that the platen will contain flexible food items to be weighed within an active scale area and out of contact with scanner components.

Figure 15A:
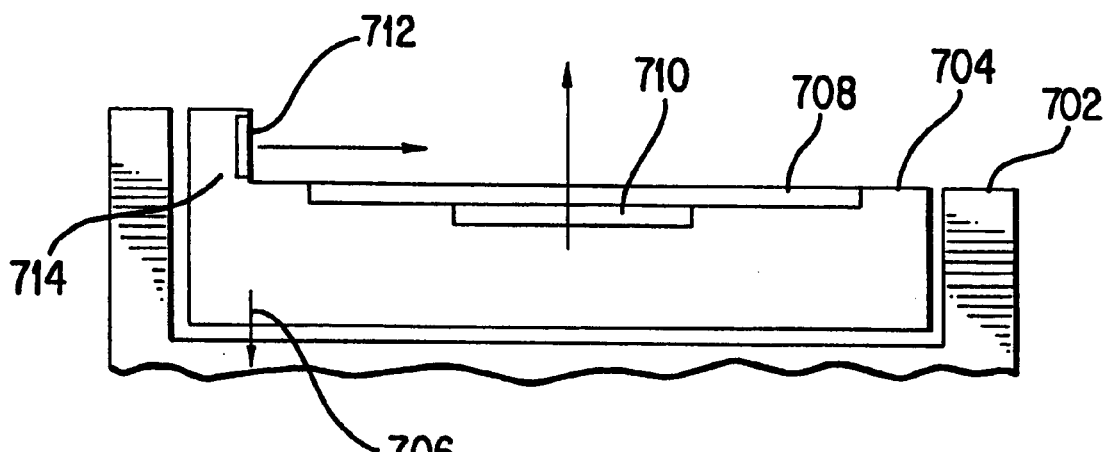
FIGS. 15(a) and 15(b) are side elevations of an integrated code reading/weighing systems in accordance with preferred embodiments of the present invention.
Figure 15B:
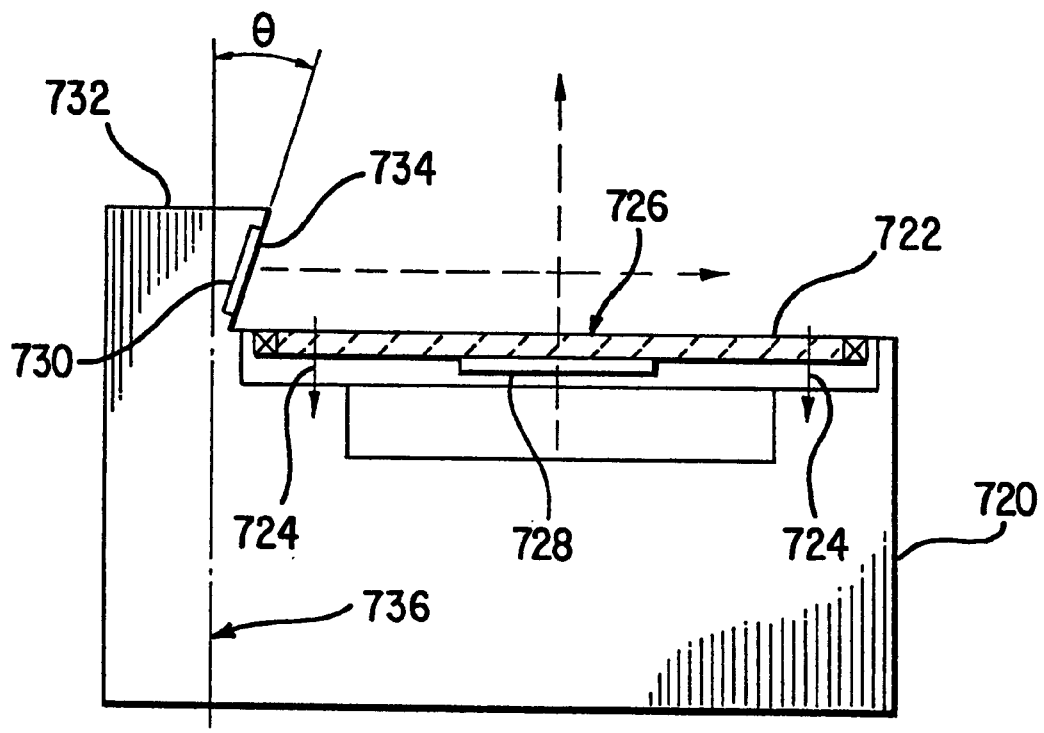

Embodiments of the present invention employ a preferred approach, depicted in FIGS. 15(a) and 15(b), for dealing with these problems.

In the device of FIG. 15(a), the entire scanning system is contained within the moving platform of the scale. More specifically, the checkout stand includes a base member 702 and a scale platform 704 which moves vertically downward relative to the base member as indicated by arrow 706 in response to the weight of objects placed on a horizontal surface 708 of the platform. The platform contains a generally vertically directed scanning head or imaging engine 710 and a generally horizontally directed one 712, located in a side rail portion 714 of the system. Advantageously, the side rail portion may be located on the operator side of the checkout stand as described above. An audible signal may be produced as an indication of the performance of a successful weighing.

In operation, a target object or food item is placed anywhere on the surface 708, and its total mass may be determined in response to the downward motion or deflection of the platform. This construction eliminates concern as to whether the food item is leaning on the scanner housing since the side rail 714 moves with the platform.

Figure 15C:
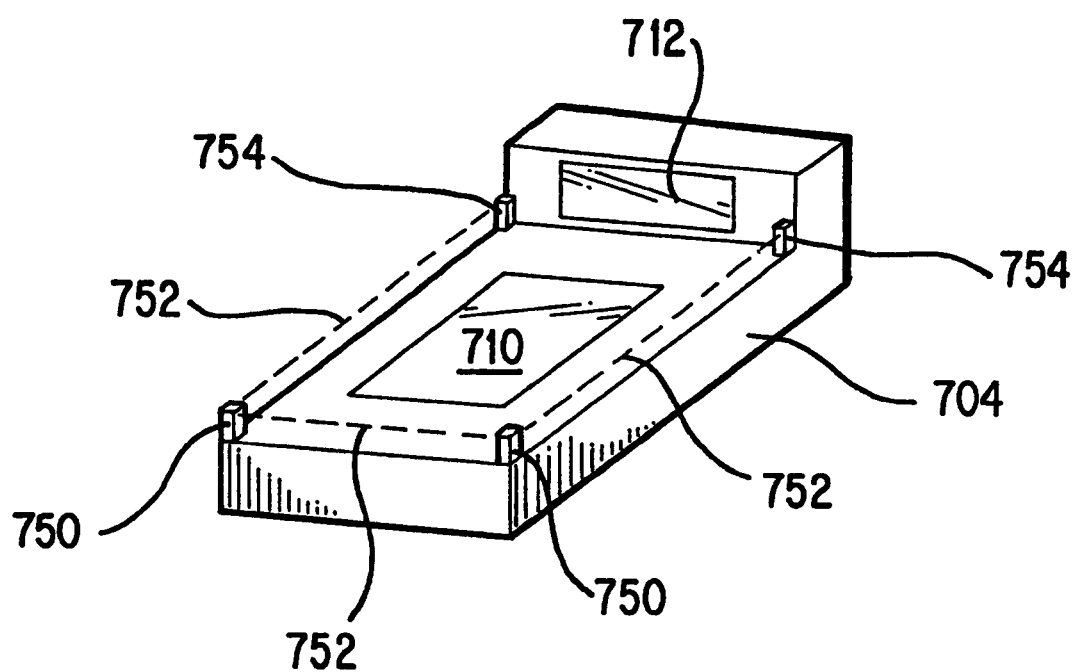
FIG. 15(c) is a top view in accordance with preferred embodiment of the present invention.

FIG. 15(c) is a pictorial view of the scale platform 704 of FIG. 15(a), illustrating further features of the present invention. The platform includes sources 750 of light such as laser diodes or photo diodes and integrated sensors. Light beams 752 travel between the sources 750 and reflective substrates such as reflective tapes 754 on the vertical portion of the scale platform. An indication is produced when an article interrupts one or more of the beams 752, thereby indicating that the article is not fully located on the scale platform. As such, the system produces a "light-rail" defining the boundaries of the horizontal weighing surface of the scale platform. It will be understood that an indication (such as an audible signal) that an article is straddling the light rail may be used to identify situations where under weighing may result from improper positioning of the article.

In FIG. 15(*b*), the checkout stand includes a base member 720 and a scale platen 722 which moves vertically downward as indicated by arrows 724 in response to the weight of objects placed on a horizontal surface 726 of the platen. The base member or platen contain a generally vertically directed scanning head or imaging engine 728 and a generally horizontally directed one 730 located in a side rail portion 732 of the base member. The window 734 of the side rail is either vertical or is inclined at an angle θ with respect to the vertical reference line 736, toward the platen. By virtue of this arrangement, objects or food products leaning against the window 734 or side rail 732 do not cause false weight measurements because all the forces from the objects or food products are directed downwardly.

The described embodiments of the present invention are intended to be illustrative rather than restrictive, and are not intended to represent every embodiment of the present invention. Various modifications and variations can be made to the disclosed systems without departing from the spirit or scope of the invention as set forth in the following claims both literally and in equivalents recognized in law.

What we claim is:

1. An optical scanning station for use by an operator in reading optical code symbols on target objects comprising a horizontal surface for supporting target objects;

a housing including a portion on a side of the horizontal surface nearest to the operator and extending above the plane of the horizontal surface, the portion of the housing containing at least a first optical code reading module for reading optical codes on sides of the target objects including a side generally facing the operator;

a horizontal window in said horizontal surface;

at least a second optical code reading module located underneath the horizontal window for reading optical code on at least the underside of target objects located on the horizontal window; and wherein the raised portion of the housing is a side rail which rises no more than about two inches above the plane of the horizontal surface and wherein the first optical code reading module is positioned a distance away from the edge of the horizontal window nearest the side rail, said distance being selected to permit the field of view of the first module to project upwardly to a sufficient degree to include symbols on the sides of target objects facing the operator and located above the edge of the horizontal window nearest the operator.

2. The optical scanning station of claim 1, further comprising a third optical code reading module located in said housing portion, which third module together with the first module have fields of view which include, respectively, upper and lower areas on the sides of target objects facing the operator and located above the edge of the horizontal window nearest the operator.

3. The optical scanning station of claim 2, further comprising a fourth code reading module with a field of view angled in a direction toward a leading edge of the target object; and a fifth code reading module with a field of view angled in a direction toward a trailing edge of the target object.

4. An optical scanning station for use by an operator in reading optical code symbols on target objects comprising a horizontal surface for supporting target objects; and a housing including a portion on a side of the horizontal surface nearest to the operator and extending above the plane of the horizontal surface, the portion of the housing containing at least a first optical code reading module for reading optical codes on sides of the target objects including a side generally facing the operator, and the housing includes a data input device and display.

5. An optical scanning station for use by an operator in reading optical code symbols on target objects comprising a horizontal surface for supporting target objects;

a housing including a portion on a side of the horizontal surface nearest to the operator and extending above the plane of the horizontal surface, the portion of the housing containing at least a first optical code reading module for reading optical codes on sides of the target objects including a side generally facing the operator; and a movable optical code reading module capable of hand-guided aiming and operation and a holding member for selectively holding the movable optical code reading module in a position to read optical codes on target objects located on the horizontal surface.

* * * * *